(12) United States Patent
Abe

(10) Patent No.: US 11,467,792 B2
(45) Date of Patent: Oct. 11, 2022

(54) APPARATUS AND CONTROL METHOD

(71) Applicant: CANON KABUSHIKI KAISHA, Tokyo (JP)

(72) Inventor: Koichi Abe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/885,107

(22) Filed: May 27, 2020

(65) Prior Publication Data
US 2020/0379702 A1    Dec. 3, 2020

(30) Foreign Application Priority Data

May 31, 2019  (JP) .............................. JP2019-102865

(51) Int. Cl.
| | |
|---|---|
| G06F 3/12 | (2006.01) |
| H04W 4/80 | (2018.01) |
| H04N 1/00 | (2006.01) |
| G06F 3/0482 | (2013.01) |

(52) U.S. Cl.
CPC .......... *G06F 3/1292* (2013.01); *G06F 3/0482* (2013.01); *H04N 1/00307* (2013.01); *H04W 4/80* (2018.02); *G06F 3/1204* (2013.01); *H04N 2201/006* (2013.01); *H04N 2201/0094* (2013.01)

(58) Field of Classification Search
CPC .... G06F 3/1292; G06F 3/0482; G06F 3/1226; G06F 3/1236; G06F 3/1203; G06F 3/04847; G06F 1/3278; G06F 1/3284; G06F 1/1626; G06F 1/163; G06F 1/1698; G06F 1/3209; H04W 4/80; H04W 4/02; H04W 76/14; H04W 4/025; H04W 4/027; H04N 1/00307; H04N 2201/006; H04N 2201/0094; Y02D 10/00
USPC ....................................................... 358/1.15
See application file for complete search history.

(56) References Cited

U.S. PATENT DOCUMENTS

| | | | | |
|---|---|---|---|---|
| 2009/0174611 | A1* | 7/2009 | Schlub ..................... | H01Q 9/42 343/702 |
| 2010/0069008 | A1* | 3/2010 | Oshima .................... | H04W 4/02 455/41.3 |
| 2012/0190386 | A1* | 7/2012 | Anderson ............. | H04L 67/306 455/456.3 |
| 2016/0191980 | A1* | 6/2016 | Yu ......................... | H04N 21/818 725/40 |
| 2017/0140144 | A1* | 5/2017 | Bock ....................... | G06Q 20/40 |
| 2018/0191641 | A1* | 7/2018 | Treue .................... | H04W 88/06 |

FOREIGN PATENT DOCUMENTS

| | | |
|---|---|---|
| JP | 2015-195467 A | 11/2015 |
| JP | 2016-145836 A | 8/2016 |
| JP | 2017-037427 A | 2/2017 |
| JP | 2017-135650 A | 8/2017 |
| JP | 2017-229054 A | 12/2017 |
| JP | 2018-004302 A | 1/2018 |

* cited by examiner

*Primary Examiner* — Darryl V Dottin
(74) *Attorney, Agent, or Firm* — Canon U.S.A., Inc. I.P. Division

(57) ABSTRACT

An apparatus that executes communication includes a communication unit configured to transmit advertising information, and an acquisition unit configured to acquire position information of the apparatus, wherein the communication unit transmits advertising information including the acquired position information.

22 Claims, 27 Drawing Sheets

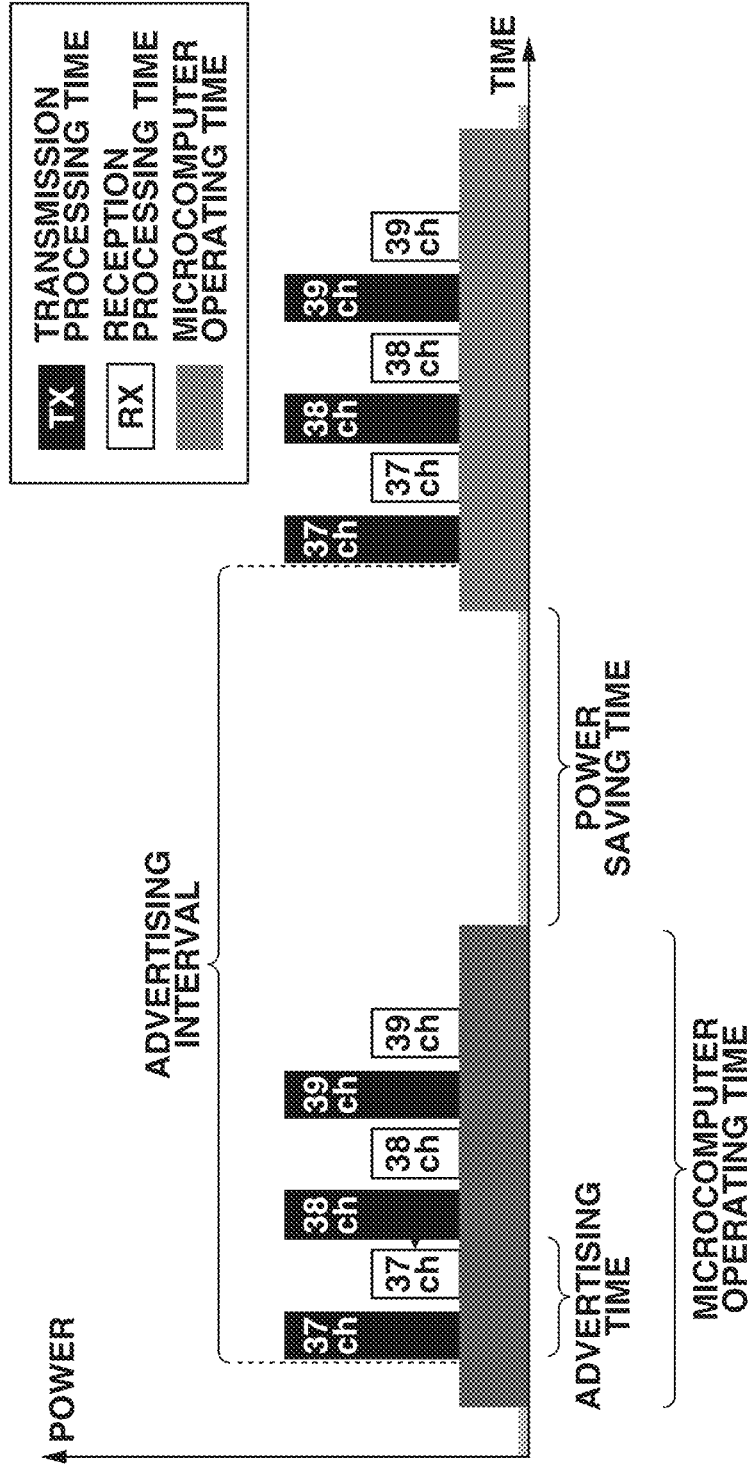

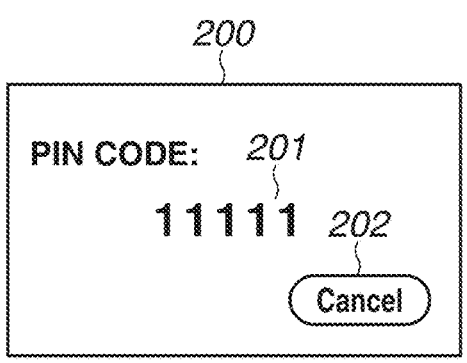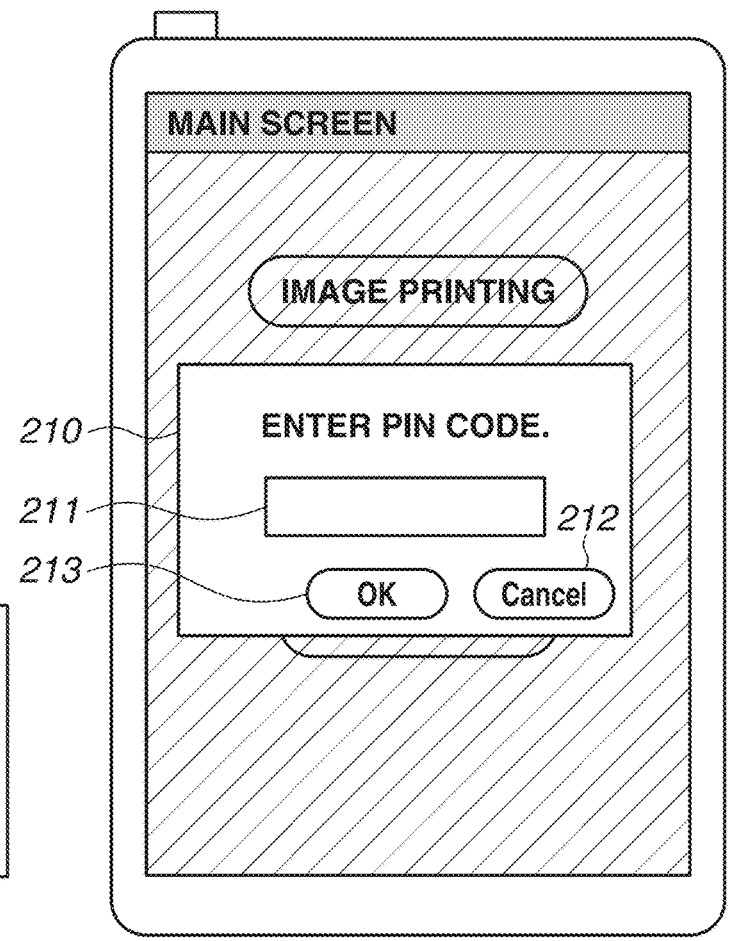

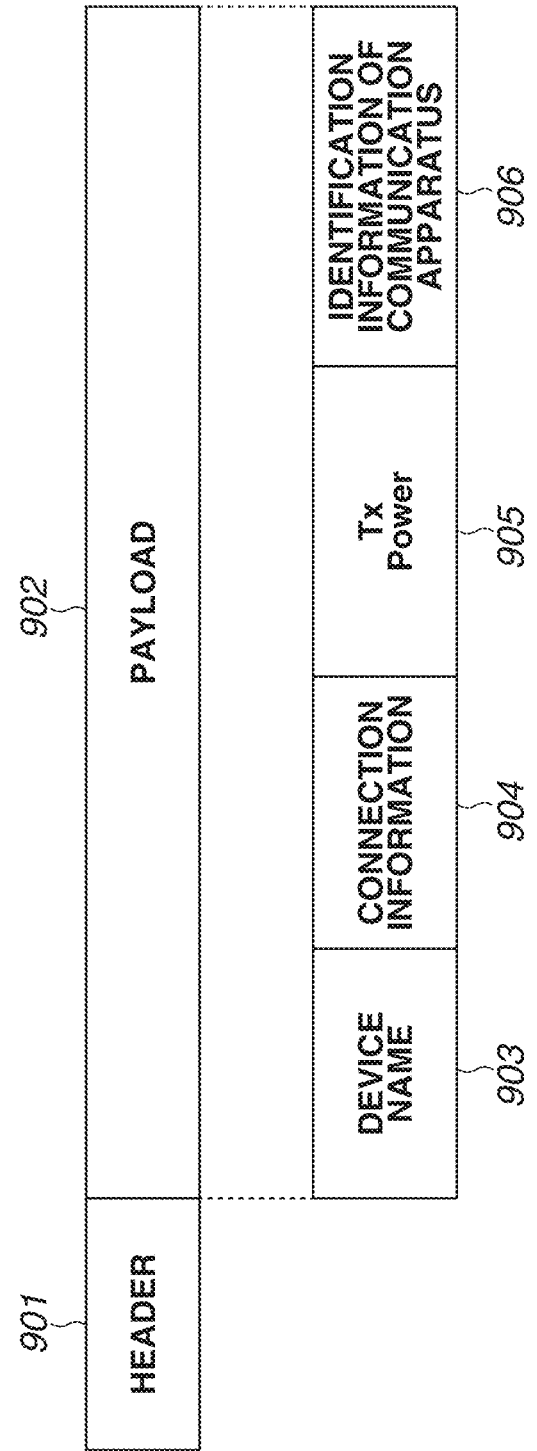

FIG. 11

| Service UUID | Service Name | Characteristic UUID | Characteristic Name | Service Readable | Service Writable | Characteristic Readable | Characteristic Writable | Characteristic Indicatable | Value | Pairing Necessity |
|---|---|---|---|---|---|---|---|---|---|---|
| 0 x 1801 | GATT Service | 0 x 2A05 | Service Changed | | | | | ○ | 0 | |
| | | 0 x 2B2A | Database Hash | ○ | | ○ | | | F0 CA 48 2D 48 EC F5 8B AC 8A AA 30 BB B9 FB A9 90 | |
| 0 x 180A | Device Information | 0 x 2A29 | Manufacturer Name String | ○ | | ○ | | | Printer Device | |
| | | 0 x 2A24 | Hardware Revision String | | | ○ | | | 1010_AAA | |
| | | 0 x 2A25 | Firmware Revision String | | | ○ | | | 2030000 | |
| | | 0 x 2A26 | Software Revision String | | | ○ | | | 0001 | |
| 00000000-0000-1000-1000-00405 f9b34fb | IJ Original | 00000000-0000-2000-1000-00405 f9b34fb | SSID | ○ | | ○ | | | Printer SSID | ○ |
| | | 00000000-0000-2000-1000-00405 f9b34fc | Password | | | ○ | | | aaaabbbb | ○ |

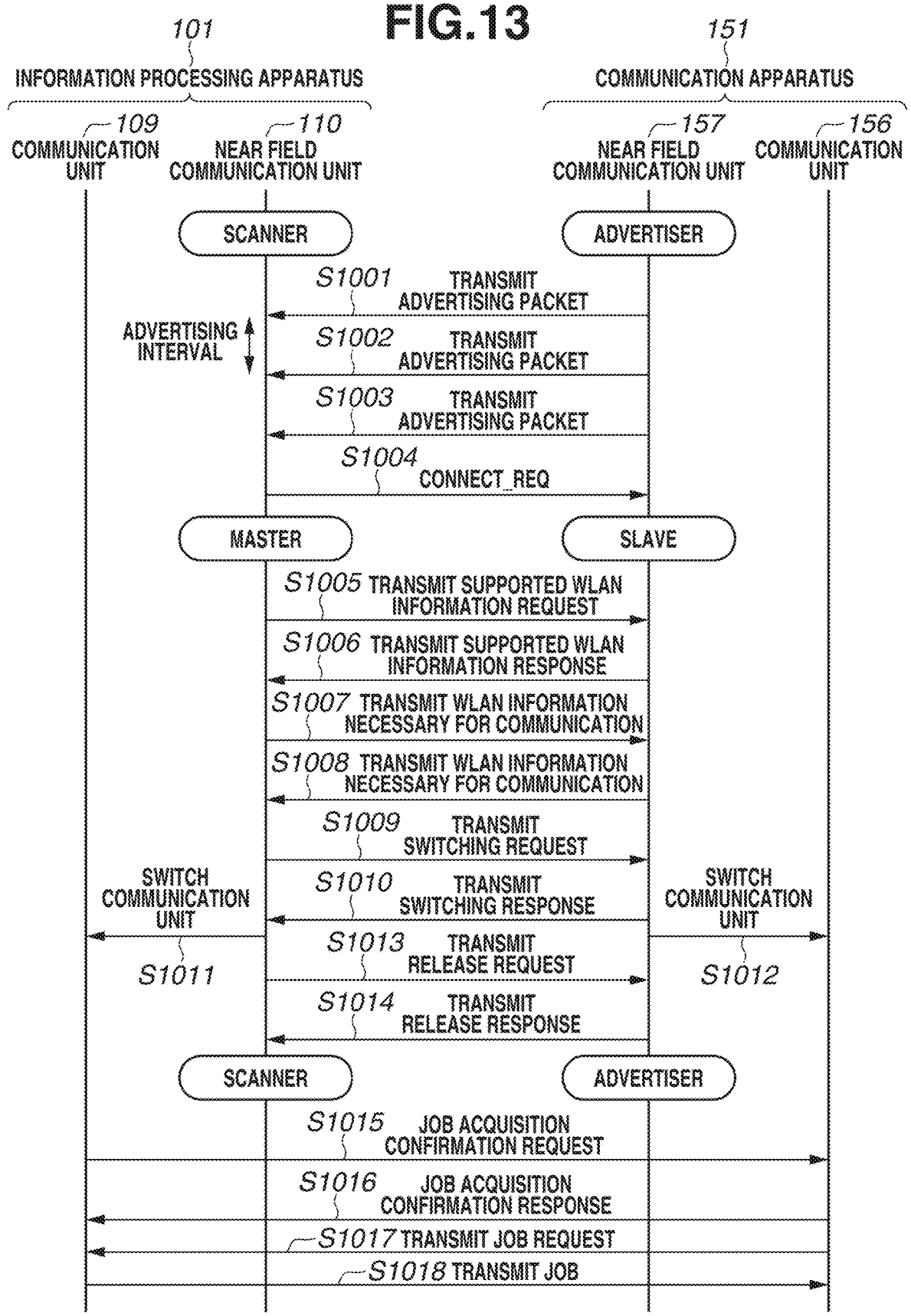

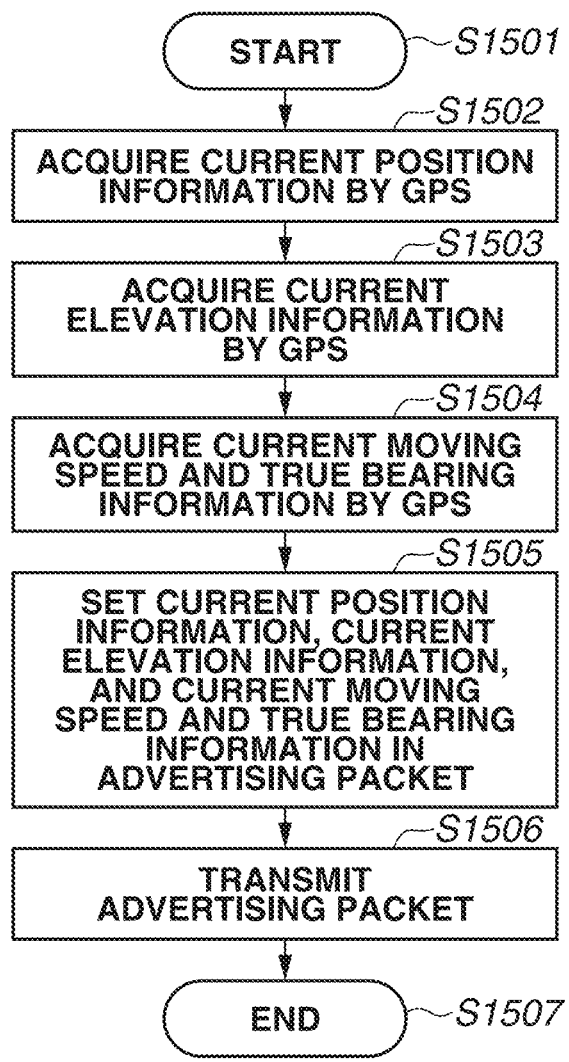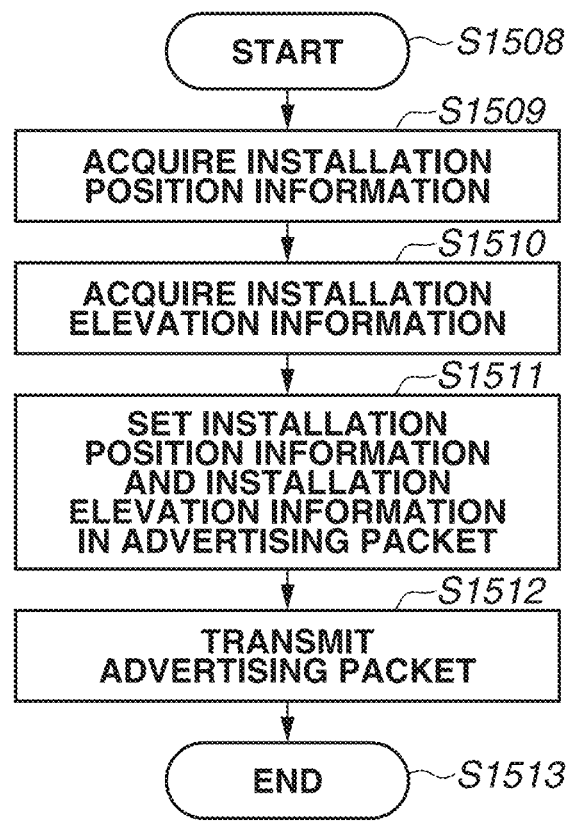

FIG.19

REGISTRATION OF INSTALLATION INFORMATION — 1901

INSTALLATION POSITION (DEGREE) (DEG FORMAT): 35.51 — 1902

INSTALLATION ELEVATION (METER): 633 — 1903

FIG.21

| RADIO FIELD INTENSITY (dBm) | RADIO FIELD INTENSITY LEVEL (5 LEVELS) | ESTIMATED DISTANCE |
|---|---|---|
| -50 OR MORE | 5 | LESS THAN 1 m |
| -55 OR MORE AND LESS THAN -50 | 4 | 1 m OR MORE AND LESS THAN 2 m |
| -60 OR MORE AND LESS THAN -55 | 3 | 2 m OR MORE AND LESS THAN 4 m |
| -65 OR MORE AND LESS THAN -60 | 2 | 4 m OR MORE AND LESS THAN 8 m |
| LESS THAN -65 | 1 | 8 m OR MORE |

FIG.22

| NAME | SYMBOL | VALUE (EXAMPLE) | UNIT (DESCRIPTION) |
|---|---|---|---|
| POSITION | place | 35.51 | DEGREE (DEG FORMAT, DECIMAL NOTATION) |
| ELEVATION | elevation | 333 | METER |
| MOVING SPEED | speed | 2.5 | knot |
| TRUE BEARING | direction | 120.8 | DEGREE |

FIG.23A

< EXAMPLE OF SCAN_REQUEST >
SCAN_REQ

FIG.23B

< EXAMPLE OF SCAN_RESPONSE (RETURN POSITION AND ELEVATION) >
SCAN_RSP
place: 35.51, elevation: 333

FIG.23C

< EXAMPLE OF SCAN_RESPONSE (RETURN POSITION, ELEVATION, MOVING SPEED, AND TRUE BEARING) >
SCAN_RSP
place: 35.51, elevation: 333, speed: 2.5, direction: 120.8

FIG.25A

< EXAMPLE OF SCAN_REQUEST (REQUEST POSITION AND ELEVATION AS OPTION) >
SCAN_REQ
opt: place, elevation

FIG.25B

< EXAMPLE OF SCAN_REQUEST (REQUEST POSITION, ELEVATION, MOVING SPEED, AND TRUE BEARING AS OPTION) >
SCAN_REQ
opt: place, elevation, speed, direction

FIG.25C

< EXAMPLE OF SCAN_RESPONSE (RETURN POSITION AND ELEVATION) >
SCAN_RSP
place: 35.51, elevation: 333

FIG.25D

< EXAMPLE OF SCAN_RESPONSE (RETURN POSITION, ELEVATION, MOVING SPEED, AND TRUE BEARING) >
SCAN_RSP
place: 35.51, elevation: 333, speed: 2.5, direction: 120.8

FIG.27A

< EXAMPLE OF OPTION SETTING (POSITION AND EFFECTIVE TIME) >
place, time: 600

FIG.27B

< EXAMPLE OF OPTION SETTING (ELEVATION AND EFFECTIVE TIME) >
elevation, time: 360

FIG.27C

< EXAMPLE OF OPTION SETTING (MOVING SPEED, TRUE BEARING, AND EFFECTIVE TIME) >
speed, direction, time: 300

APPARATUS AND CONTROL METHOD

BACKGROUND OF THE INVENTION

Field of the Invention

The present disclosure relates to an apparatus and a control method.

Description of the Related Art

There is a technique of identifying a distance of an apparatus using radio field intensity of communication. The technique discussed in Japanese Patent Application Laid-Open No. 2017-037427 identifies a distance between an information processing apparatus and a communication apparatus using the intensity of advertising information that is based on the standard of Bluetooth®.

SUMMARY OF THE INVENTION

According to an aspect of the present disclosure, an apparatus that executes communication includes a communication unit configured to transmit advertising information, and an acquisition unit configured to acquire position information of the apparatus, wherein the communication unit transmits advertising information including the acquired position information.

Further features of the present invention will become apparent from the following description of exemplary embodiments with reference to the attached drawings.

BRIEF DESCRIPTION OF THE DRAWINGS

FIG. 3 is a diagram illustrating advertising in Bluetooth® Low Energy.

FIGS. 4A and 4B are schematic diagrams illustrating screens related to pairing processing.

FIG. 5 is a diagram illustrating a structure of advertising information.

FIG. 11 is a table illustrating an example of GATT data stored in a near field communication unit.

FIG. 13 is a sequence diagram illustrating processing in which the information processing apparatus and the communication apparatus perform network connection using a Bluetooth® Low Energy communication method.

FIGS. 15A and 15B are flowcharts each illustrating an example of processing in which a Bluetooth® Low Energy advertiser device transmits an advertising packet (scan_response).

FIG. 19 is a schematic diagram illustrating an example of an installation information registration screen.

FIG. 21 is a diagram illustrating an example of a table of radio field intensity, a radio field intensity level, and an estimated distance.

FIG. 22 is a diagram illustrating an example of information to be set in an advertising packet (scan_response).

FIGS. 23A, 23B, and 23C are diagrams illustrating an example of a scan_request and a scan_response.

FIGS. 25A, 25B, 25C, and 25D are diagrams illustrating an example of a scan_request and a scan_response.

FIGS. 27A, 27B, and 27C are diagrams each illustrating an example of setting information to be used in setting an option to be included in an advertising packet.

DESCRIPTION OF THE EMBODIMENTS

The present disclosure is directed to providing a technique for identifying an absolute position.

Hereinafter, exemplary embodiments of the present disclosure will be described with reference to the drawings. The following exemplary embodiments appropriately modified or improved based on the common knowledge of one skilled in the art without departing from the spirit of the present disclosure are also interpreted as falling within the scope of the present disclosure.

An information processing apparatus and a communication apparatus included in a communication system according to a first exemplary embodiment will be described. In the following description, a smartphone is used as an example of the information processing apparatus, but the information processing apparatus is not limited to this. Various processing apparatuses such as a wearable device, a mobile terminal, a laptop computer, a tablet terminal, a personal digital assistant (PDA), and a digital camera can be applied. Furthermore, a music reproduction device and a television can be applied. Various processing apparatuses can be applied as long as the processing apparatuses can perform wireless communication. In the following description, a printer is used as an example of the communication apparatus, but the communication apparatus is not limited to this. Various processing apparatus can be applied as long as the processing apparatuses can perform wireless communication. For example, printers such as an inkjet printer, a full-color laser beam printer, and a monochrome printer can be applied. The communication apparatus is not limited to printers and may be a copying machine or a facsimile apparatus. Furthermore, a smartphone, a mobile terminal, a laptop computer, a tablet terminal, a PDA, a digital camera, a music reproduction device, and a television can be applied. Moreover, a multi-function peripheral having a plurality of functions such as a copy function, a FAX function, and a printing function can also be applied.

Figure 1:
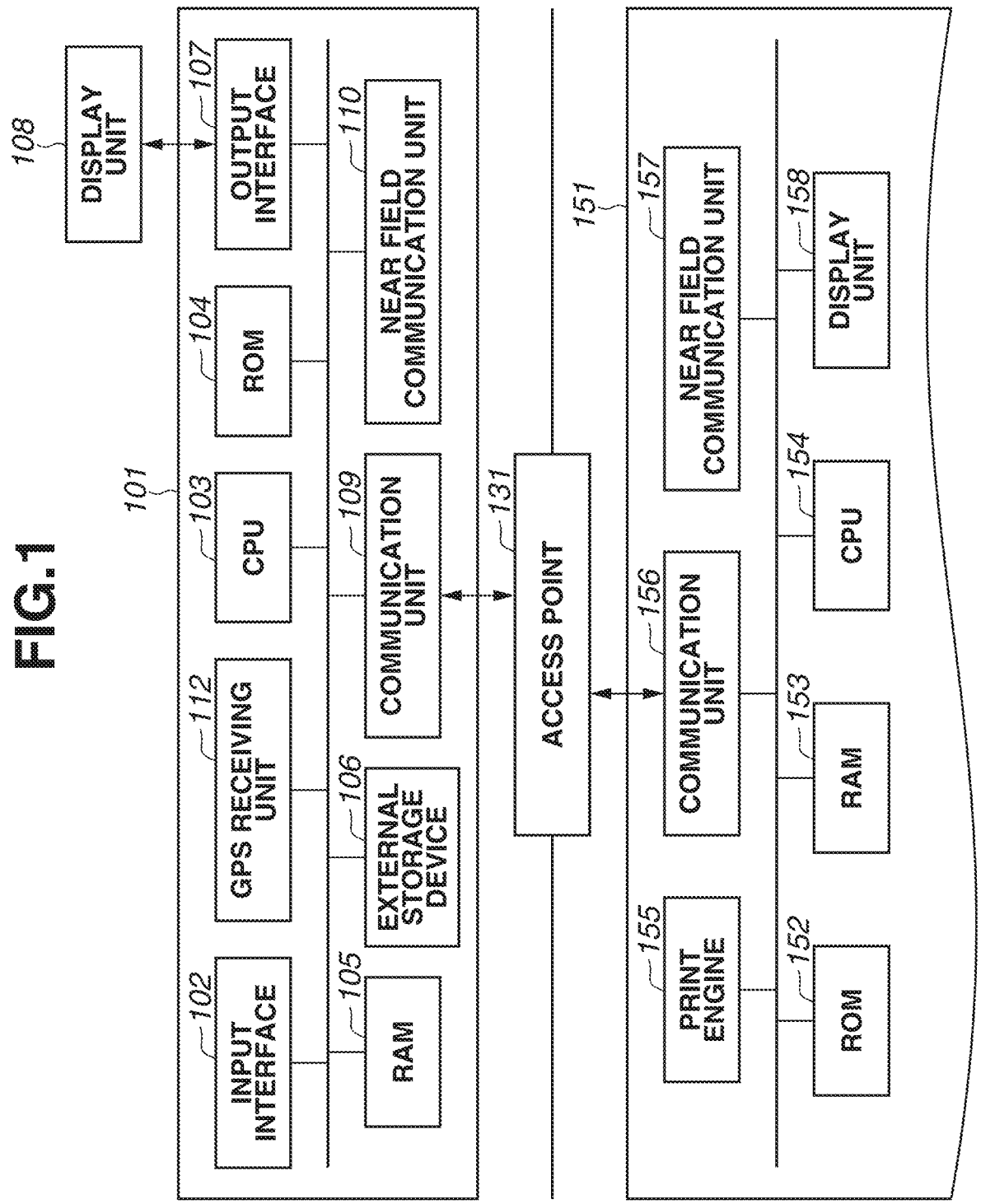
FIG. 1 is a block diagram illustrating configurations of an information processing apparatus and a communication apparatus according to an exemplary embodiment of the present disclosure.

First of all, configurations of an information processing apparatus according to the present exemplary embodiment, and a communication apparatus that can communicate with the information processing apparatus according to the present exemplary embodiment will be described with reference to a block diagram illustrated in FIG. 1.

(Information Processing Apparatus)

An information processing apparatus 101 is the information processing apparatus according to the present exemplary embodiment. The information processing apparatus 101 is a processing apparatus including an input interface 102, a central processing unit (CPU) 103, a read-only memory (ROM) 104, a random access memory (RAM) 105, an external storage device 106, an output interface 107, a display unit 108, a communication unit 109, and a near field communication unit 110.

The input interface 102 is an interface for receiving a data input and an operation instruction from a user, and includes a physical keyboard, buttons, and a touch panel. In addition, the input interface 102 and the output interface 107 to be described below may be integrated as one component. In other words, the one component may output a screen and receive an operation from the user.

The CPU 103 is a system control unit and controls the entire information processing apparatus 101.

The ROM 104 stores fixed data such as control programs to be executed by the CPU 103, data tables, and programs of an embedded operating system (hereinafter, referred to as an "OS"). In the present exemplary embodiment, each control program stored in the ROM 104 controls software execution such as scheduling, task switch, or interrupt processing under the control of the embedded OS stored in the ROM 104.

The RAM 105 includes a static random access memory (SRAM) requiring a backup power source. Because data is held in the RAM 105 by a primary battery (not illustrated) for data backup, the RAM 105 can store important data such as program control variables without volatilizing the data. The RAM 105 is also provided with a memory area for storing setting information of the information processing apparatus 101 and management data of the information processing apparatus 101. The RAM 105 is also used as a main memory and a work memory of the CPU 103.

The external storage device 106 includes a flash memory, and stores an application that provides a printing execution function, and a printing information generation program for generating printing information interpretable by a communication apparatus 151. The external storage device 106 also stores various programs such as an information transmission/reception control program to be transmitted to and received from the communication apparatus 151 connected via the communication unit 109, and various types of information to be used by these programs. Examples of an implementation method for the external storage device 106 include an implementation method of building a flash memory into the information processing apparatus 101, and an implementation method of inserting a micro secure digital (SD) card via an external slot (not illustrated).

The output interface 107 is an interface that controls the display unit 108 to display data and notify the state of the information processing apparatus 101.

The display unit 108 includes a light emitting diode (LED) or a liquid crystal display (LCD), and displays data and notifies the state of the information processing apparatus 101. By installing a software keyboard including keys such as a numerical entry key, a mode setting key, a determination key, a cancel key, and a power key on the display unit 108, an input from the user may be received via the display unit 108. In the present exemplary embodiment, an example of a smartphone having a configuration in which the display unit 108 is included in the information processing apparatus 101 will be described as an example of the information processing apparatus 101.

The communication unit 109 is a component for connecting with an apparatus such as the communication apparatus 151, and executing data communication. For example, the communication unit 109 can connect to an external access point 131 such as a wireless local area network (LAN) router. By being connected to the external access point 131, it also becomes possible for the communication apparatus 151 to communicate with the information processing apparatus 101 via the external access point 131. The connection method will be referred to as infrastructure connection. The communication unit 109 can also connect to an access point (not illustrated) in the communication apparatus 151. By the communication unit 109 and the access point in the communication apparatus 151 connecting each other, it becomes possible for the information processing apparatus 101 and the communication apparatus 151 to communicate with each other. The connection method will be referred to as direct connection. A Wireless Fidelity (Wi-Fi) Direct® may be used as a method for the direct connection. The user can desirably select whether the communication unit 109 performs infrastructure connection or direct connection with the communication apparatus 151.

Examples of a wireless communication method include Wi-Fi® which is a communication method compliant with IEEE802.11 series standards (IEEE802.11a, IEEE802.11n (Wi-Fi 4), IEEE802.11ac (Wi-Fi 5), IEEE802.11ax (Wi-Fi 6), etc.). Communication that is compliant with Bluetooth (registered trademark) may also be executed.

The near field communication unit 110 is a component for performing near field communication with an apparatus such as the communication apparatus 151 and executing data communication, and performs communication using a communication method different from the communication unit 109. The near field communication unit 110 can connect with a near field communication unit 157 in the communication apparatus 151. The near field communication unit 110 can also acquire radio field intensity. In the present exemplary embodiment, the standard of Bluetooth 5.1 is used as a communication method for the near field communication unit 110. While the Bluetooth 5.1 includes both standards of Classic Bluetooth® and Bluetooth® Low Energy, a Bluetooth® Low Energy standard of Bluetooth 5.1 is used as a communication method for the near field communication unit 157 in the present exemplary embodiment. Nevertheless, in the present exemplary embodiment, the communication method for the near field communication unit 157 is not limited to the standard. Standards having a position detection function of a level equal to or superior to that of Bluetooth 5.1 like Bluetooth standards set forth after the Bluetooth 5.1 can be applied.

Figure 14A:
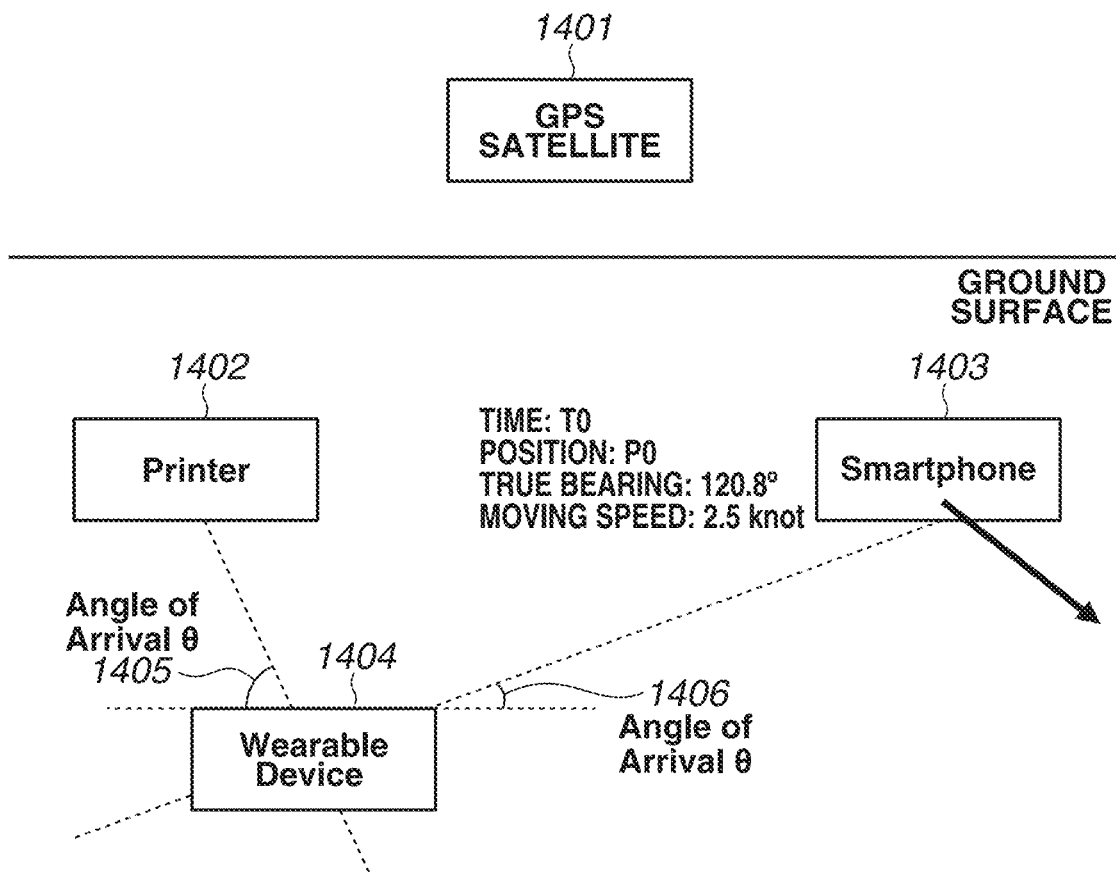
FIGS. 14A and 14B are schematic diagrams illustrating an example of a Bluetooth® Low Energy device and a global positioning system (GPS) satellite.

A global positioning system (GPS) receiving unit 112 includes a GPS receiver constituting a part of a global positioning system (hereinafter, abbreviated as "GPS"), and receives a signal from a GPS satellite 1401, which will be described below and is illustrated in FIG. 14A. The information processing apparatus 101 can recognize current position information regarding at least any of latitude, longitude, information regarding north latitude/south latitude, or information regarding east longitude/west longitude. The information processing apparatus 101 can further recognize current elevation information that is based on an elevation (above sea level), speed information regarding a speed of movement on the ground surface, and true bearing information of movement on the ground surface. In a case where the information processing apparatus 101 is a simple device like a wearable device, the information processing apparatus 101 does not include the GPS receiving unit 112 in some cases.

(Communication Apparatus)

The communication apparatus 151 is a communication apparatus according to the present exemplary embodiment. The communication apparatus 151 is a processing apparatus including a ROM 152, a RAM 153, a CPU 154, a print engine 155, a communication unit 156, and the near field communication unit 157.

The communication unit 156 includes an access point for connecting with an apparatus such as the information processing apparatus 101, as an access point in the communication apparatus 151. The access point allows the communication apparatus 151 to operate as a base station, and the communication unit 109 of the information processing apparatus 101 can connect to the access point. In other words, the communication unit 156 can perform direct connection with the information processing apparatus 101 using the internal access point via wireless communication. The communication unit 156 may include hardware functioning as an access point, or may operate as an access point by software for causing the communication unit 156 to function as an access point. In addition, the communication unit 156 may also function as a group owner which is a base station of Wi-Fi Direct®. Alternatively, the communication apparatus 151 may communicate with the information processing apparatus 101 via the external access point 131 by the infrastructure connection. The user can desirably select whether the communication unit 156 performs the infrastructure connection or the direct connection with the information processing apparatus 101.

Examples of a communication method include Wi-Fi® which is a communication method compliant with IEEE802.11 series standards (IEEE802.11a, IEEE802.11n (Wi-Fi 4), IEEE802.11ac (Wi-Fi 5), IEEE802.11ax (Wi-Fi 6), etc.). Communication that is compliant with Bluetooth® may also be executed.

The near field communication unit 157 is a component for performing near field communication with an apparatus such as the information processing apparatus 101. In the present exemplary embodiment, the standard of Bluetooth 5.1 is used as a communication method for the near field communication unit 157. More specifically, the Bluetooth® Low Energy standard of Bluetooth 5.1 is used as a communication method for the near field communication unit 157 in the present exemplary embodiment. Nevertheless, in the present exemplary embodiment, a communication method for the near field communication unit 157 is not limited to the standard. Standards having a position detection function of a level equal to or superior to that of Bluetooth 5.1 like Bluetooth standards set forth after the Bluetooth 5.1 can be applied.

The RAM 153 includes an SRAM requiring a backup power source. Because data is held in the RAM 153 by a primary battery (not illustrated) for data backup, the RAM 105 can store important data such as program control variables, and installation position information and installation elevation information that are illustrated in FIG. 19, without volatilizing the data and the information. The RAM 153 is also provided with a memory area for storing setting information of the communication apparatus 151 and management data of the communication apparatus 151. The RAM 153 is also used as a main memory and a work memory of the CPU 154, and stores a receive buffer for temporarily storing printing information received from the information processing apparatus 101 and various types of information.

The ROM 152 stores fixed data such as control programs to be executed by the CPU 154, data tables, and OS programs. In the present exemplary embodiment, each control program stored in the ROM 152 controls software execution such as scheduling, task switch, or interrupt processing under the control of an embedded OS stored in the ROM 152.

The CPU 154 is a system control unit, and controls the entire communication apparatus 151.

Based on information stored in the RAM 153 and a print job received from the information processing apparatus 101, the print engine 155 forms an image on a recording medium such as paper using recording material such as ink and outputs a printed result. A print job transmitted from the information processing apparatus 101 at this time has a large transmission data amount, and thus high-speed communication is required. The print job is therefore received via the communication unit 156 that can perform communication at higher speed than the near field communication unit 157. In a case where the communication apparatus 151 is not a printer, the communication apparatus 151 does not include the print engine 155.

In a case where the communication apparatus 151 is a terminal device such as a smartphone, a mobile terminal, a laptop computer, or a table terminal, the communication apparatus 151 desirably includes the GPS receiving unit 112 similarly to the information processing apparatus 101. The GPS receiving unit 112 receives a signal from the GPS satellite 1401, which will be described below and is illustrated in FIG. 14A. The communication apparatus 151 can recognize current position information regarding at least any of latitude, longitude, information regarding north latitude/south latitude, or information regarding east longitude/west longitude, current elevation information that is based on an elevation (above sea level), speed information regarding a speed of movement on the ground surface, and true bearing information of movement on the ground surface.

A display unit 158 includes an LCD equipped with a touch panel, and also includes a software keyboard function (not illustrated). The user can input characters and numbers and operate buttons in the display unit 158.

In addition, a memory such as an external hard disk drive (HDD) or an SD card may be attached to the communication apparatus 151 as an optional device, and information stored in the communication apparatus 151 may be stored in the memory.

In the communication apparatus 151 according to the present exemplary embodiment, a connection mode is set by connection setting processing, and the communication apparatus 151 communicates with the information processing apparatus 101 by a connection method that is based on the set connection mode. In the case of performing communication via the infrastructure connection, an infrastructure connection mode is set as a connection mode in the communication apparatus 151 according to the present exemplary embodiment. In the case of performing communication via the direct connection, a direct connection mode is set as a connection mode in the communication apparatus 151 according to the present exemplary embodiment. Furthermore, by activating both the infrastructure connection mode and the direct connection mode, a mode in which both types of connection are concurrently operable can also be set.

In the present exemplary embodiment, as an example in the direct connection, the description has been given of an example in which the communication apparatus 151 functions as a base station (functions as an access point (AP) or functions as a group owner of Wi-Fi Direct), and the information processing apparatus 101 functions as a slave station. Nevertheless, the role allotment in the present exemplary embodiment is not specifically limited to this role allotment. In other words, in the direct connection, the information processing apparatus 101 may operate as a base station and the communication apparatus 151 may operate as a slave station.

In the present exemplary embodiment, the information processing apparatus 101 stores a predetermined application in the ROM 104 or the external storage device 106. When the communication apparatus 151 is a printer, for example, the information processing apparatus 101 desirably stores, as the predetermined application, an application program for transmitting a print job for printing image data in the information processing apparatus 101, to the communication apparatus 151. An application having such a function will be hereinafter referred to as a printing application. The printing application may have another function aside from the printing function. For example, in a case where the communication apparatus 151 has a scan function, the printing application may have a function of scanning a document set in the communication apparatus 151, a function of performing another setting of the communication apparatus 151, and a function of checking the state of the communication apparatus 151. In other words, the printing application may have a function of transmitting a scan job and a setting job to the communication apparatus 151 aside from a print job. The predetermined application is not limited to the printing application, and may be an application program having a function other than a printing function.

(Advertising in Bluetooth® Low Energy Standard)

In the present exemplary embodiment, the description will be given of a case where the near field communication unit 110 of the information processing apparatus 101 and the near field communication unit 157 of the communication apparatus 151 perform communication by Bluetooth® Low Energy. In the present exemplary embodiment, the near field communication unit 157 of the communication apparatus 151 functions as an advertiser (or slave) that broadcasts advertising information (advertising packet) to be described below. In addition, the near field communication unit 110 of the information processing apparatus 101 functions as a scanner (or master) that receives the advertising information. The description will also be given assuming that the communication unit 109 and the communication unit 156 perform communication via a wireless LAN (Wi-Fi).

Processing of transmitting advertising information and receiving a Bluetooth® Low Energy connection request in the Bluetooth® Low Energy standard will now be described. In the present exemplary embodiment, as described above, because the near field communication unit 157 operates as a slave device, the near field communication unit 157 transmits advertising information and receives a Bluetooth® Low Energy connection request. The near field communication unit 157 performs communication while dividing a frequency band of 2.4 GHz into 40 channels (0th to 39th ch). Among the 40 channels, the near field communication unit 157 uses 37th to 39th channels for transmitting advertising information and receiving a Bluetooth® Low Energy connection request, and uses 0th to 36th channels for performing data communication after Bluetooth® Low Energy connection.

Figure 2:
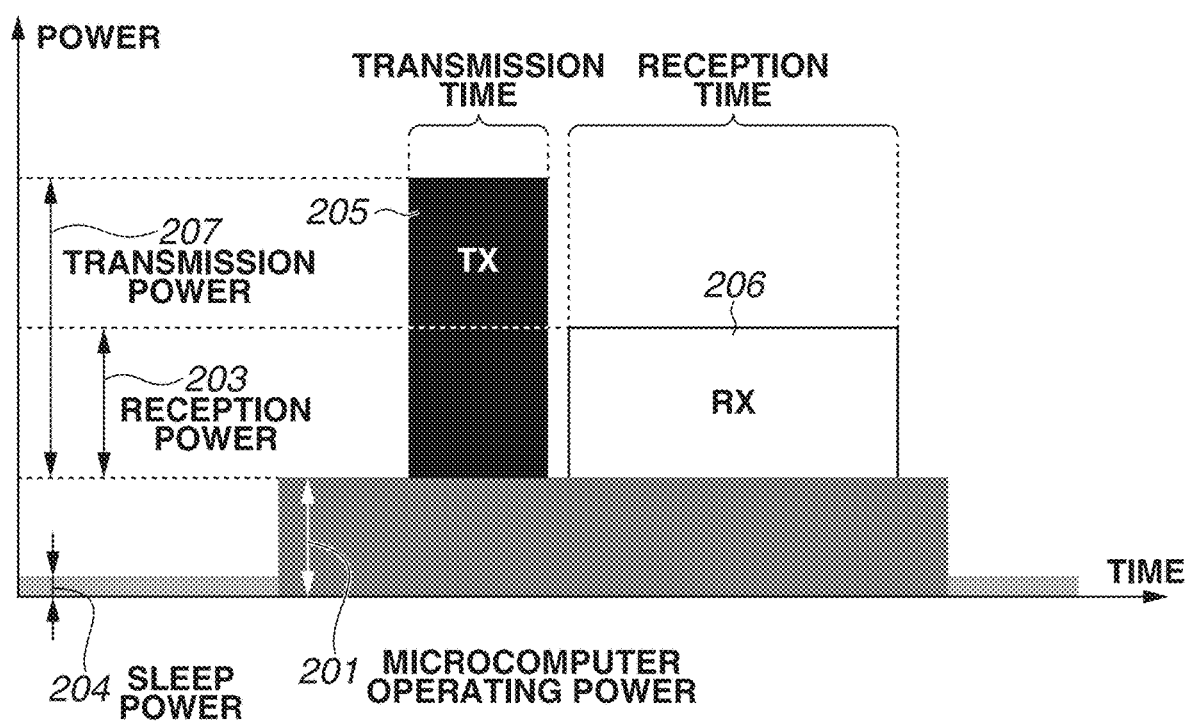
FIG. 2 is a diagram illustrating power consumption in transmitting advertising information.

FIG. 2 is a diagram illustrating power consumption in transmitting advertising information. In FIG. 2, a vertical axis indicates power consumption of the near field communication unit 157 and a horizontal axis indicates time. The vertical axis indicates power consumption in transmitting advertising information using one channel, for each type of processing. Tx 205 indicates total power consumption in transmission processing which is processing of broadcasting advertising information. Rx 206 indicates total power consumption in reception processing which processing of activating a receiver for receiving a Bluetooth® Low Energy connection request. Transmission power 207 indicates momentary power consumed by the transmission processing. In addition, reception power 203 indicates momentary power consumed by the reception processing. In addition, microcomputer operating power 201 indicates momentary power consumed when a microcomputer in the near field communication unit 157 is operating. The microcomputer operates before the transmission processing corresponding to the Tx 205, after the reception processing corresponding to the Rx 206, and between the transmission processing and the reception processing because the microcomputer needs to be activated in advance for executing and stopping the transmission processing and the reception processing. In the case of transmitting advertising information using a plurality of channels, power consumption increases as the number of channels used for transmitting advertising information increases. While the microcomputer is not operating and the near field communication unit 157 is in a power saving state, sleep power 204 corresponds to momentary power consumption of the near field communication unit 157. In this manner, by performing the transmission processing using a predetermined channel and then performing the reception processing for a certain period of time using the same channel, the near field communication unit 157 waits for a Bluetooth® Low Energy connection request to be transmitted from the information processing apparatus 101.

FIG. 3 is a diagram illustrating the details of advertising. As illustrated in FIG. 3, the near field communication unit 157 repeats the transmission processing and the reception processing of advertising information three times in total for separate channels, and then stops the operation of the microcomputer, enters the power saving state, and stays in the power saving state for a certain period of time. Hereinafter, a combination of the transmission processing and the reception processing of advertising information that are performed using a predetermined channel will be referred to as advertising. In addition, a time interval at which advertising information is transmitted using the predetermined channel will be referred to as an advertising interval. The number of times advertising is repeated from when first advertising is performed to when the near field communication unit 157 enters the power saving state can be arbitrarily changed as long as the number is three or less. In FIG. 3, channels are sequentially used in advertising in the order of the 37th channel, the 38th channel, and the 39th channel, but this order may be set at random. In addition, the order may vary between the first advertising, the second advertising, the third advertising, and subsequent advertising.

FIG. 5 illustrates an example of a structure of advertising information to be broadcasted by the near field communication unit 157 to the neighborhood of the communication apparatus 151. When power supply is started, the near field communication unit 157 performs initializing processing and enters an advertising state. When the near field communication unit 157 enters the advertising state, the near field communication unit 157 periodically broadcasts advertising information to the neighborhood based on an advertising interval. The advertising information includes a header 901 and a payload 902. By receiving the advertising information, the information processing apparatus 101 can recognize the existence of the communication apparatus 151. Furthermore, by transmitting a Bluetooth® Low Energy connection request to the communication apparatus 151, the information processing apparatus 101 can connect with the communication apparatus 151 by Bluetooth® Low Energy. The header 901 is a region storing information such as the type of the advertising information and the size of the payload 902. The payload 902 stores information such as a device name 903 (device information) serving as identification information, on-board profile information, connection information 904 for connecting with the communication apparatus 151 by Bluetooth® Low Energy, and transmission power (Tx Power) 905 of the advertising information. Identification information 906 of the communication apparatus 151 and information regarding the status of the communication apparatus 151 (error, power state, etc.) may be included in the payload 902 of the advertising information. Examples of the identification information 906 of the communication apparatus 151 include a media access control (MAC) address of the communication apparatus 151, service information of the communication apparatus 151, and a service set identifier (SSID) and a password of an access point in the communication apparatus 151. In addition, each piece of information illustrated in FIG. 22 and to be described below is desirably included in the payload 902 as well.

In the present exemplary embodiment, when the power of the communication apparatus 151 is turned ON, the near field communication unit 157 enters the advertising state and starts the transmission of advertising information. Nevertheless, a timing at which the near field communication unit 157 starts the transmission of advertising information is not limited to the above-described timing. For example, the near field communication unit 157 may start the transmission of advertising information at a timing at which a predetermined operation for activating a Bluetooth® Low Energy function is performed. Even when a power button of the communication apparatus 151 is pressed and the communication apparatus 151 enters a power off state or even when the communication apparatus 151 enters a sleep mode by a power saving function, the transmission of advertising information may be performed by supplying power to the near field communication unit 157.

For example, the near field communication unit 157 may initially transmit first advertising information. Then, if a scan_request for the first advertising information is received from the information processing apparatus 101, the near field communication unit 157 may transmit, as a scan_response, second advertising information which is different in content of stored information from the first advertising information. For example, the first advertising information includes information regarding transmission power of advertising information and identification information of the near field communication unit 157. Then, the second advertising information includes identification information of the communication apparatus 151, and information regarding functions and hardware included in the communication apparatus 151. If a connection request (CONNECT_REQ) is received from the information processing apparatus 101 that has received the second advertising information serving as a scan_response, connection is established between the communication apparatus 151 and the information processing apparatus 101. In such a configuration, for example, the printing application is designed to handle the second advertising information. Thus, in the following description, advertising information to be handled by the printing application is the second advertising information. Each piece of information illustrated in FIG. 22 and to be described below may be included in the first advertising information, but is desirably included in the second advertising information.

The above description has been given of an example in which the near field communication unit 157 of the communication apparatus 151 functions as an advertiser or a slave, and the near field communication unit 110 of the information processing apparatus 101 functions a scanner or a master. Nevertheless, in the present exemplary embodiment, the roles may be opposite. More specifically, the near field communication unit 110 of the information processing apparatus 101 may function as an advertiser or a slave that broadcasts advertising information, and the near field communication unit 157 of the communication apparatus 151 may function as a scanner or a master that receives the advertising information.

(Bluetooth 5.1)

In the Bluetooth 5.1, direction detection that uses an angle of arrival (AoA) or an angle of departure (AoD) can be performed. A relative positional relationship between apparatuses can be thereby identified. For example, relative positions of two neighboring apparatuses equipped with a Bluetooth function can be identified with an accuracy of several centimeters.

Figure 6:
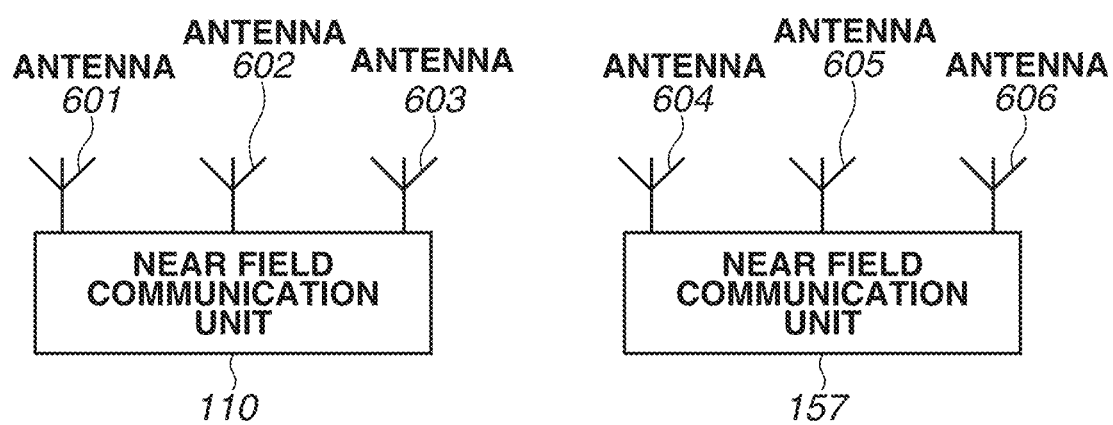
FIG. 6 is a schematic diagram illustrating a configuration of a near field communication unit.

FIG. 6 is a block diagram illustrating a function by which the information processing apparatus 101 detects the direction of the communication apparatus 151 using advertising information transmitted by the near field communication unit 157 in the communication apparatus 151. The near field communication unit 110 in the information processing apparatus 101 includes antennas 601, 602, and 603, and the near field communication unit 157 in the communication apparatus 151 includes antennas 604, 605, and 606. The number of antennas included in the near field communication unit 110 or the near field communication unit 157 is not limited to this. The number of antennas may be one, two, or three or more. In addition, the number of antennas included in the near field communication unit 110 and the number of antennas included in the near field communication unit 157 may be different. FIG. 6 illustrates a configuration in which the antennas included in the near field communication unit 110 and the antennas included in the near field communication unit 157 are arranged on the straight line, but the arrangement of the antennas is not limited to this. If the number of antennas is three or more, the antennas may be two-dimensionally arranged.

Figure 7:
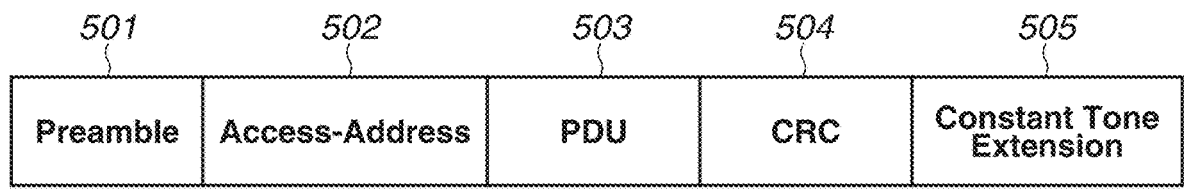
FIG. 7 is a diagram illustrating a structure of advertising information in detecting a direction in Bluetooth® Low Energy.

FIG. 7 illustrates an example of a structure of advertising information to be transmitted by the near field communication unit 157 in the communication apparatus 151 for causing the information processing apparatus 101 to detect a distance from the communication apparatus 151 and the direction of the position of the communication apparatus 151. A Constant Tone Extension (CTE) 505 is data used for detecting the direction of the communication apparatus 151 with respect to the information processing apparatus 101. A Preamble 501 is data for clock synchronization that is to be used when the information processing apparatus 101 receives advertising information of the communication apparatus 151. An Access-Address 502 is data for frame synchronization that is to be used when the information processing apparatus 101 receives advertising information of the communication apparatus 151. A protocol data unit (PDU) 503 is an actual data portion of advertising information to be transmitted by the communication apparatus 151. The header 901 and the payload 902 that have been described with reference to FIG. 5 and serve as advertising information correspond to information included in the PDU 503. A cyclic redundancy check (CRC) 504 is an error-detecting code to be used in the communication of the PDU 503.

There are two methods as methods by which the information processing apparatus 101 detects the direction of the communication apparatus 151. More specifically, there are a method implemented by the near field communication unit 110 including a plurality of antennas (method using AoA), and a method implemented by the near field communication unit 157 including a plurality of antennas (method using AoD). Hereinafter, the details of the methods will be described.

(Method Using AoA)

A method by which the information processing apparatus 101 detects the direction of the communication apparatus 151 that is implemented by the near field communication unit 110 including a plurality of antennas will be described with reference to FIG. 8. The near field communication unit 157 transmits, from the antenna 604, an AoA radio signal 703 serving as advertising information including the CTE 505. The near field communication unit 110 receives the AoA radio signal 703 by a plurality of antennas (both the antennas 601 and 602). A phase difference between the AoA radio signals 703 received by the antennas 601 and 602 (i.e., phase difference between pieces of received advertising information) is denoted by ψ, and a wavelength is denoted by λ. By using an AoA inter-antenna distance d 701 which is a distance between the antennas 601 and 602, an angle of arrival θ 702 indicating the direction of the communication apparatus 151 with respect to the information processing apparatus 101 is calculated from the following formula (1). When the AoA inter-antenna distance d 701 is included in advertising information, the AoA inter-antenna distance d 701 may be acquired from the advertising information, or may be acquired by Generic Attribute Profile (GATT) communication.

$$\theta = \arccos((\psi\lambda)/(2\pi d)) \quad (1)$$

In this manner, by calculating the angle of arrival θ 702, the information processing apparatus 101 that has received advertising information from the communication apparatus 151 can detect the direction of the communication apparatus 151.

(Method Using AoD)

Figure 9:
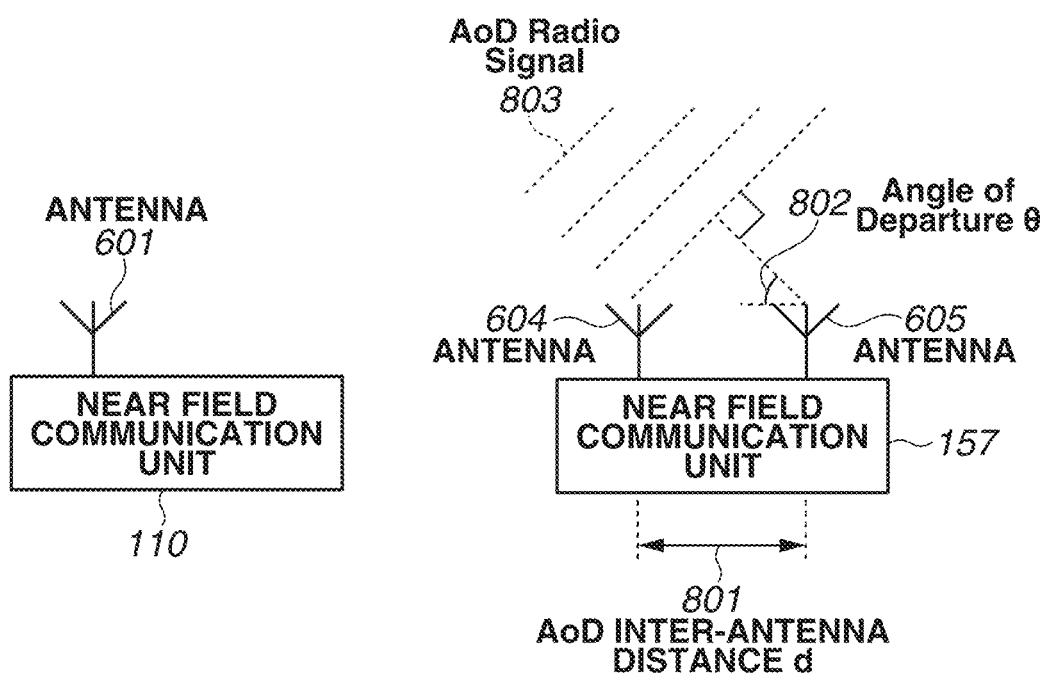
FIG. 9 is a schematic diagram illustrating a configuration including a plurality of antennas on an advertising transmission side in detecting a direction in Bluetooth® Low Energy.

Next, a method by which the information processing apparatus 101 detects the direction of the communication apparatus 151 that is implemented by the near field communication unit 157 including a plurality of antennas will be described with reference to FIG. 9. The near field communication unit 157 transmits an AoD radio signal 803 serving as advertising information including the CTE 505, from a plurality of antennas (both the antennas 604 and 605). The near field communication unit 110 receives the AoD radio signal 803 by the antenna 601. In the communication apparatus 151, the antenna 604 transmits advertising information at a predetermined cycle, and then, the antenna 605 transmits advertising information at the same cycle without interval. In this case, because the antennas 604 and 605 consecutively transmit advertising information at the same cycle, a phase difference dependent on a distance between the antennas 604 and 605 is detected from the advertising information received by the antenna 601.

A phase difference between the AoD radio signals 803 received by the antennas 604 and 605 is denoted by ψ, and a wavelength is denoted by λ. By using an AoD inter-antenna distance d 801 which is a distance between the antennas 604 and 605, an angle of departure θ 802 indicating the direction of the communication apparatus 151 with respect to the information processing apparatus 101 is calculated from Formula (2).

$$\theta = \arccos((\psi\lambda)/(2\pi d)) \quad (2)$$

In this manner, by calculating the angle of departure θ 802, the information processing apparatus 101 that has received advertising information from the communication apparatus 151 can detect the direction of the communication apparatus 151.

In the description of the method implemented by the near field communication unit 110 including a plurality of antennas, the two antennas 601 and 602 are used as the plurality of antennas, but the number of antennas to be used is not limited to this. For example, the information processing apparatus 101 may use three or more antennas, and acquire the angle of arrival θ 702 by calculating an average of angles of arrival θ obtained from the respective antennas. In a similar manner, also in the method implemented by the near field communication unit 157 including a plurality of antennas, the number of antennas to be used as the plurality of antennas is not limited to the above-described number. For example, the communication apparatus 151 may use three or more antennas, and acquire the angle of departure θ 802 by calculating an average of angles of departure θ obtained from the respective antennas.

The above-description has been given of an exemplary embodiment in which either one apparatus of the information processing apparatus 101 and the communication apparatus 151 uses a plurality of antennas, but an exemplary embodiment is not limited to this. Both the apparatuses may use a plurality of antennas.

The above-description has been given of a configuration in which the information processing apparatus 101 detects the direction of one communication apparatus 151, but the configuration is not limited to this. The information processing apparatus 101 may detect the directions of two or more communication apparatuses 151. In addition, by detecting the directions of two or more communication apparatuses 151 and referring to the detected data, the information processing apparatus 101 can detect a distance between apparatuses, directions, and positions more accurately as compared with the configuration in which the information processing apparatus 101 detects the direction of one communication apparatus 151.

The above-description has been given of an example in which the communication apparatus 151 transmits advertising information, and the information processing apparatus 101 receives the advertising information and detects the direction of the communication apparatus 151. Nevertheless, in the present exemplary embodiment, the roles may be opposite. More specifically, the information processing apparatus 101 may transmit advertising information, and the communication apparatus 151 may receive the advertising information and detect the direction of the information processing apparatus 101.

(GATT Communication in Bluetooth® Low Energy Standard)

An overview of GATT communication in the Bluetooth® Low Energy standard will now be described. A GATT is a profile for controlling reading/writing (transmission/reception) of information in the Bluetooth® Low Energy standard. The GATT communication is communication performed by Bluetooth® Low Energy connection being established after advertising. In the GATT communication, two roles including a GATT client and a GATT server are defined based on a transfer source and a transfer destination of data.

The GATT client transmits a request to the GATT server and receives a response from the GATT server. In the present exemplary embodiment, the information processing apparatus 101 functions as the GATT client. The GATT client can read information stored in a storage region in a near field communication unit of the GATT server, and write information into the storage region.

When the GATT server receives a request from the GATT client, the GATT server returns a response to the GATT client. In the present exemplary embodiment, the communication apparatus 151 functions as the GATT server. The GATT server operates as a device that stores information such as state information of the GATT server.

Figure 10:
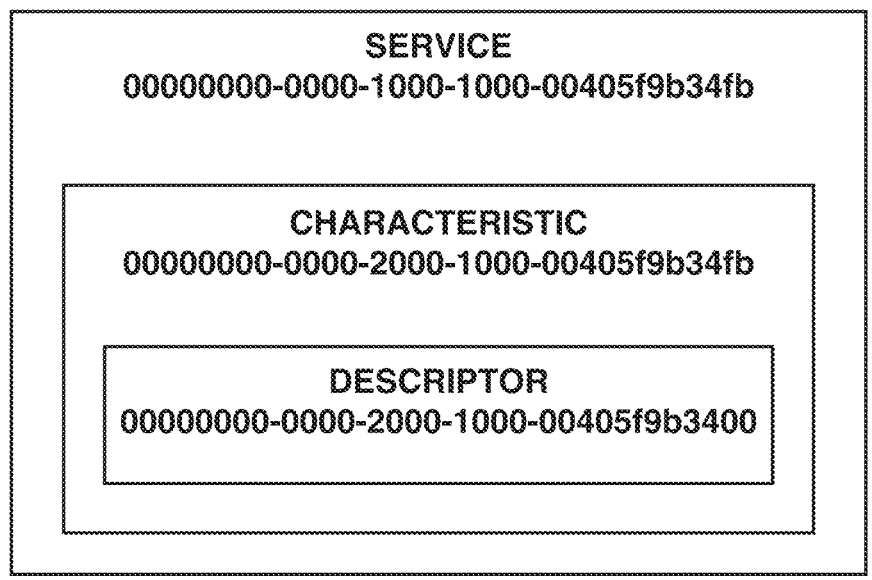
FIG. 10 is a diagram illustrating a data format of a Generic Attribute Profile (GATT).

FIG. 10 is a diagram illustrating a data format of the GATT. GATT data has a hierarchical structure as illustrated in FIG. 10, and includes three elements called a service, a characteristic, and a descriptor. Nevertheless, the descriptor needs not exist. In the present exemplary embodiment, the descriptor does not exist in GATT data constructed by the near field communication unit 157.

The service, the characteristic, and the descriptor can be each identified by a universally unique identifier (UUID) represented by 32-digit alphanumeric characters. The UUID is used as an identifier for uniquely identifying an object on software. The UUID is represented by 128-bit numerical values, but is normally represented by the hexadecimal number system like "550e8400-e29b-41d4-a716-446655440000".

While some services, characteristics, and descriptors are defined as standard by the Bluetooth Special Interest Group (SIG), the other services, characteristics, and descriptors are specific to the vendors. UUIDs of the service, the characteristic, and the descriptor that are specific to a vendor are each represented by 32-digit alphanumeric characters as described above, and UUIDs of the service, the characteristic, and the descriptor that are defined as standard by the Bluetooth SIG are each represented by 4-digit alphanumeric characters. More specifically, for example, UUIDs of the service, the characteristic, and the descriptor that are defined as standard by the Bluetooth SIG are each represented like "2A49".

The service is obtained by grouping attributes in GATT data by common classification, and each service includes one or more characteristics. A value unique to each characteristic is set in the characteristic. An attribute value to be used when the characteristic requires additional information is set in the descriptor. In the service, the characteristic, and the descriptor, a reading/writing attribute which is a setting value indicating whether to permit the GATT client to execute reading or writing can be set.

By designating the respective UUIDs of the service and the characteristic, the GATT client can execute reading/writing with respect to the value set in the designated characteristic. Nevertheless, whether reading/writing can be executed is based on a reading/writing attribute set in each service or characteristic.

FIG. 11 illustrates an example of GATT data constructed by the near field communication unit 157. In the GATT data illustrated in FIG. 11, a "Service UUID" indicates a UUID allocated to each service. As described above, a UUID is described in 4 digits or 32 digits. A "Service name" indicates a name of each service. A "Characteristic UUID" indicates a UUID allocated to each characteristic. As described above, a UUID is described in 4 digits or 32 digits. A "Characteristic name" indicates a name of each characteristic. "Service readable" indicates whether the information processing apparatus 101 can read a value related to each service. "Service writable" indicates whether the information processing apparatus 101 can write a value related to each service. "Characteristic readable" indicates whether the information processing apparatus 101 can read a value related to each characteristic. "Characteristic writable" indicates whether the information processing apparatus 101 can write a value related to each characteristic. "Characteristic indicatable" indicates whether the communication apparatus 151 can indicate (notify) an updated value to the information processing apparatus 101 when the communication apparatus 151 updates a value related to each characteristic. "Pairing necessity" indicates whether the information processing apparatus 101 is unpermitted to write or read a value related to each characteristic unless pairing is performed.

When the "Service readable" indicates "readable (○)" and the "Characteristic readable" indicates "readable (○)", the information processing apparatus 101 can read a value related to a corresponding characteristic. In contrast, when the "Service readable" indicates "readable (○)" and the "Characteristic readable" indicates "unreadable (blank)", the information processing apparatus 101 cannot read a value related to a corresponding characteristic. A "value" indicates a value set in each characteristic. In addition, when "pairing necessity" indicates "pairing unnecessary (blank), the information processing apparatus 101 can read and write a value related to a corresponding characteristic even in a state where pairing with the communication apparatus 151 has not been performed. In contrast, when "pairing necessity" indicates "pairing necessary (○), the information processing apparatus 101 cannot read or write a value related to a corresponding characteristic unless pairing with the communication apparatus 151 is performed.

In the present exemplary embodiment, authentication is performed between the information processing apparatus 101 and the communication apparatus 151, and pairing processing for executing data reading and writing between apparatuses via GATT communication is executed. In a state where pairing is not executed between the information processing apparatus 101 and the communication apparatus 151, the communication apparatus 151 does not permit information reading and writing by GATT communication. This can prevent the communication apparatus 151 from communicating with the information processing apparatus 101 that has not performed pairing, and prevent information stored in the communication apparatus 151 from being acquired by the information processing apparatus 101 that has not performed pairing, for example. In the present exemplary embodiment, while a certain type of GATT communication is permitted even in a state where pairing has not been performed, another type of GATT communication is not permitted in a state where pairing has not been performed. By enabling information with low confidentiality to be communicated through the GATT communication permitted in a state where pairing has not been performed, the convenience of communication can be enhanced. On the other hand, by enabling information with high confidentiality to be communicated only through the GATT communication unpermitted in a state where pairing has not been performed, the security of communication can be enhanced.

The details of the pairing processing will be described with reference to FIG. 4. First of all, when the above-described printing application is activated and an execution instruction of pairing processing is received from the user via the printing application, the information processing apparatus 101 starts to search for advertising information including specific apparatus information. Examples of the specific apparatus information include a UUID and a MAC address of an apparatus (printer, etc.) corresponding to the printing application. Then, if the information processing apparatus 101 receives advertising information including specific apparatus information, the information processing apparatus 101 displays, on a display unit, a list of transmission source apparatuses of advertising information including specific apparatus information, and receives the selection of a pairing target apparatus from the user. The description will now be given for a case where the communication apparatus 151 is selected.

Then, if the information processing apparatus 101 receives the selection of a pairing target apparatus, the information processing apparatus 101 transmits a pairing request to the communication apparatus 151 through communication performed in conformity to a security manager protocol (SMP). The communication between the apparatuses is performed in conformity to the security manager protocol until the pairing ends.

If the communication apparatus 151 receives the pairing request, the communication apparatus 151 displays, on the display unit 158, a PIN code display screen 200 as illustrated in FIG. 4A. On the PIN code display screen 200, a PIN code 201 and a Cancel button 202 for cancelling the pairing processing are displayed. Then, if the information processing apparatus 101 transmits a pairing request, the information processing apparatus 101 displays, on the display unit 108, a PIN code entry screen 210 as illustrated in FIG. 4B. On the PIN code entry screen 210, a PIN code entry region 211 for receiving the entry of the PIN code 201 performed by the user is displayed. Furthermore, an OK button 213 for transmitting the entered PIN code 201 to the communication apparatus 151, and a Cancel button 212 for cancelling the pairing processing are displayed. If the OK button 213 is pressed in a state where the PIN code 201 is entered into the PIN code entry region 211, the information processing apparatus 101 transmits information including the entered PIN code 201 to the communication apparatus 151. The communication apparatus 151 determines whether the PIN code 201 included in the received information matches the PIN code 201 displayed on the PIN code display screen 200, and if the communication apparatus 151 determines that the PIN codes 201 match, the communication apparatus 151 permits the information processing apparatus 101 to execute pairing. Specifically, the communication apparatus 151 exchanges a link key (authentication information) created by a predetermined method based on the PIN code 201, with the information processing apparatus 101 using the SMP of the Bluetooth® Low Energy standard. The exchanged link keys are respectively stored into a storage region (the ROM 104, etc.) included in the information processing apparatus 101 and a storage region (the ROM 152, etc.) included in the communication apparatus 151. The pairing is thereby completed, and Bluetooth® Low Energy communication is permitted to be executed between apparatuses thereafter. When the pairing is completed, the information processing apparatus 101 hides the PIN code display screen 200, and displays an original screen again.

After the pairing is completed, when transmitting a GATT communication request to the communication apparatus 151, the information processing apparatus 101 notifies the link key stored in the storage region during the pairing processing, to the communication apparatus 151. If the communication apparatus 151 receives the GATT communication request, the communication apparatus 151 compares the link key stored in the storage region during the pairing processing and the notified link key, and confirms whether an apparatus that has transmitted the GATT communication request is an apparatus that has performed pairing. Then, if it is confirmed that the apparatus is an apparatus that has performed pairing, the communication apparatus 151 starts reading and writing of information via GATT communication performed with the information processing apparatus 101. The information processing apparatus 101 can thereby execute GATT communication with the communication apparatus 151 thereafter without the user entering a PIN code as long as the pairing processing with the communication apparatus 151 is once completed.

The above description has been given of a configuration in which the user is prompted to enter the PIN code 201 displayed on the PIN code entry screen 210, into the PIN code entry region 211, but the configuration is not limited to the configuration. For example, by setting fixed information (cannot be arbitrarily changed by the user) as the PIN code 201, and storing the fixed information into the information processing apparatus 101 together with the installation of the printing application, the PIN code 201 may be notified to the communication apparatus 151 without the user entering the PIN code 201. In addition, a start timing of the pairing processing is not limited to the above-described configuration, and may be a timing at which the user issues a printing instruction via the printing application or a timing earlier than the time when Bluetooth® Low Energy connection is performed in the connection setting processing, for example.

The PIN code entry screen 210 displayed by the information processing apparatus 101 needs not be displayed via the printing application. For example, the information processing apparatus 101 may include an application for setting (hereinafter, referred to as a "setting application"). The setting application is an application program for performing the setting related to a function to be executed by an OS. The setting application is an application program installed together with an OS in a series of processes in which the OS is installed onto the information processing apparatus 101, or preinstalled onto the information processing apparatus 101 together with an OS when the information processing apparatus 101 arrives, for example. When the information processing apparatus 101 performs pairing with the communication apparatus 151, the information processing apparatus 101 may activate the setting application and shift the printing application to a background state, and receive, from the user, an entry for pairing that is performed on a Bluetooth setting screen displayed by the setting application.

The above-description has been given of a pairing method of entering a PIN code, but a pairing method is not limited to the above-described method. A pairing method other than the PIN code entry method will be described below. The information processing apparatus 101 acquires information called a key seed, which is information stored in the communication apparatus 151, from the communication apparatus 151 via Bluetooth® Low Energy connection. Then, the information processing apparatus 101 and the communication apparatus 151 generate link keys from the key seed in accordance with a rule preliminary recognized by each apparatus. The generated link keys are respectively stored into a storage region (the ROM 104, etc.) included in the information processing apparatus 101 and a storage region (the ROM 152, etc.) included in the communication apparatus 151. In other words, the information processing apparatus 101 and the communication apparatus 151 store the same link keys. By generating the link keys in this manner and enabling GATT communication that uses the link keys, authentication between the communication apparatus 151 and the information processing apparatus 101 is performed, and the pairing processing is completed. After the pairing processing is completed, information encrypted based on the link keys is communicated through the communication performed between the information processing apparatus 101 and the communication apparatus 151. When the information processing apparatus 101 and the communication apparatus 151 receive the information encrypted based on the link keys, the information processing apparatus 101 and the communication apparatus 151 can recognize unencrypted information by decrypting the information using the link keys respectively stored in the information processing apparatus 101 and the communication apparatus 151.

(Sequence of Advertising and Bluetooth® Low Energy Connection)

Figure 12:
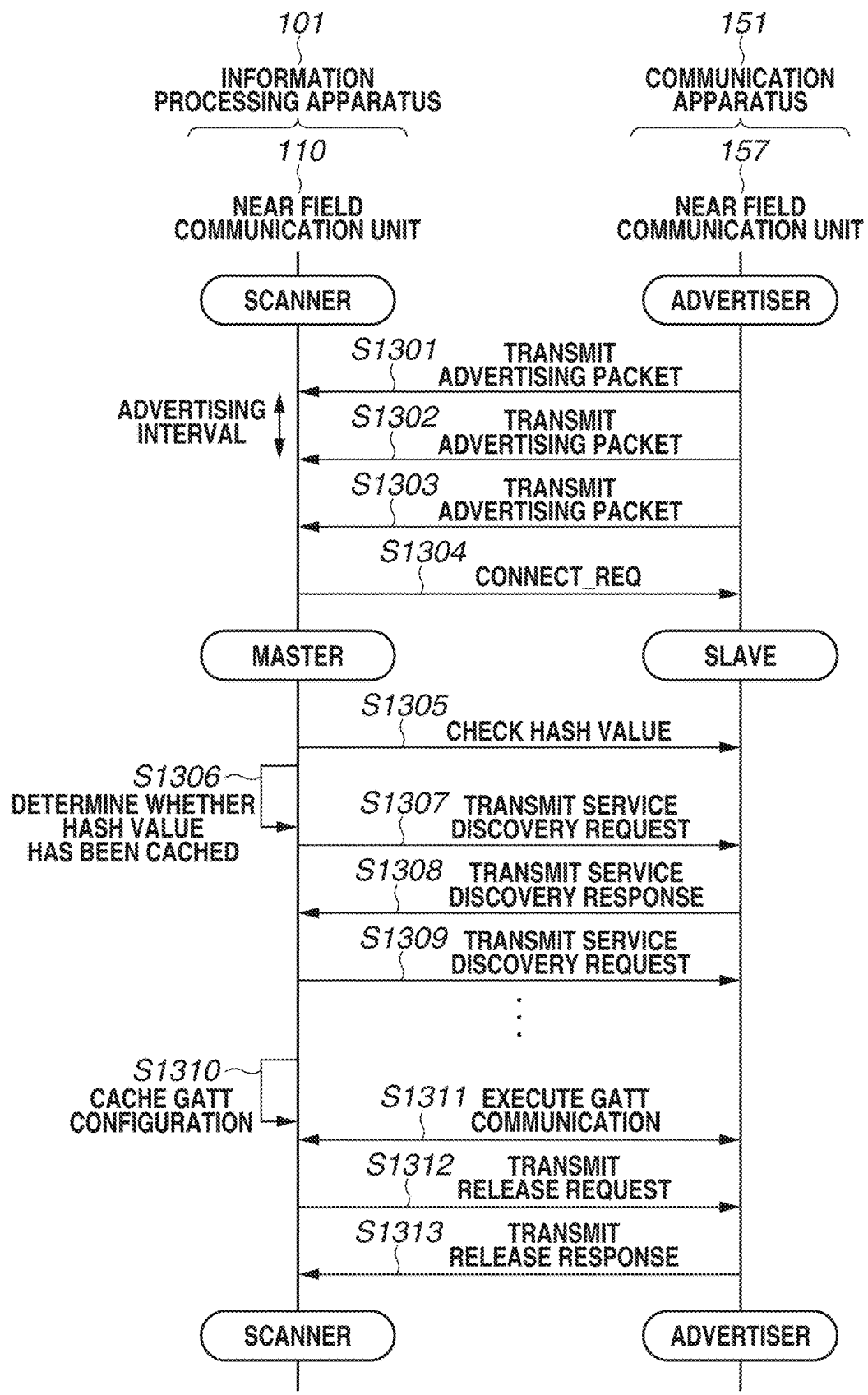
FIG. 12 is a sequence diagram illustrating processing in which the information processing apparatus and the communication apparatus perform connection using a Bluetooth® Low Energy communication method.

FIG. 12 is a sequence diagram illustrating Bluetooth® Low Energy communication performed between the information processing apparatus 101 and the communication apparatus 151. The processing of the communication apparatus 151 that is indicated by the processing sequence is implemented by the CPU 154 loading a control program stored in the ROM 152 or an HDD (not illustrated) included in the communication apparatus 151, onto the RAM 153, and executing the control program. The processing of the information processing apparatus 101 that is indicated by the processing sequence is implemented by the CPU 103 loading a control program stored in the ROM 104 or an HDD (not illustrated) included in the information processing apparatus 101, onto the RAM 105, and executing the control program.

In the following description, the communication apparatus 151 functions an advertiser that transmits advertising information at predetermined intervals. In addition, the information processing apparatus 101 functions as a scanner that waits for advertising information to be transmitted from a nearby advertiser. First, in steps S1301 to S1303, the near field communication unit 157 in the communication apparatus 151 transmits advertising information. The information processing apparatus 101 can recognize the existence of the communication apparatus 151 by the near field communication unit 110 receiving the advertising information transmitted from the near field communication unit 157.

If the information processing apparatus 101 recognizes the communication apparatus 151 and determines to connect with the communication apparatus 151, the information processing apparatus 101 transmits connection request information to the communication apparatus 151. Specifically, in step S1304, the near field communication unit 110 transmits CONNECT_REQ which is a connection request for transitioning to a connection event of establishing network connection by Bluetooth® Low Energy. As described above, the near field communication unit 157 may separately execute advertising in response to the first advertising information and the second advertising information (scan_response). More specifically, the near field communication unit 110 may transmit a scan_request in response to the first advertising information, and may transmit a connection request (CONNECT_REQ) in response to the second advertising information (scan_response). If the near field communication unit 157 receives the CONNECT_REQ, the information processing apparatus 101 and the communication apparatus 151 prepare for transitioning to the connection event. Specifically, the near field communication unit 110 and the near field communication unit 157 respectively notify the CPU 103 and the CPU 154 that connection processing for GATT communication has been completed.

Then, the information processing apparatus 101 and the communication apparatus 151 respectively transition to a master and a slave from the scanner and the advertiser, and the information processing apparatus 101 functioning as a master and the communication apparatus 151 functioning as a slave establish connection (Bluetooth® Low Energy connection) for GATT communication. In the Bluetooth® Low Energy standard, a master can form a "one-to-many" star-shaped topology with slaves. After establishing the Bluetooth® Low Energy connection, the information processing apparatus 101 and the communication apparatus 151 can perform data communication thereafter using a GATT communication method.

Before accessing GATT data of the communication apparatus 151 via GATT communication, the information processing apparatus 101 needs to acquire a configuration of GATT data owned by the communication apparatus 151. Examples of the configuration of GATT data include the number of services in GATT data, the number of characteristics, values of UUIDs, and an attribute indicating readability. Processing in which the information processing apparatus 101 acquires the configuration of GATT data will be referred to as "discovery".

For the above-described reason, after the Bluetooth® Low Energy connection has been established in step S1304, in step S1305, the information processing apparatus 101 starts discovery. Specifically, the information processing apparatus 101 transmits, to the communication apparatus 151, a discovery request for requesting information indicating the configuration of GATT data of the communication apparatus 151. The communication apparatus 151 accordingly transmits information indicating the configuration of GATT data to the information processing apparatus 101 as a response to the discovery request. The information processing apparatus 101 that has received the information indicating the configuration of GATT data identifies a region in the GATT data of the communication apparatus 151 in which a hash value is stored, and reads the hash value. The hash value is a value stored in a Database Hash characteristic having 0x2B2A as a Characteristic UUID as illustrated in FIG. 11. The communication apparatus 151 stores, as a value of the Database Hash characteristic, a hash value calculated in advance by the communication apparatus 151 from the configuration of GATT data. In other words, a hash value is a value uniquely defined in accordance with the configuration of GATT data of the communication apparatus 151.

In addition, the information processing apparatus 101 stores, in a memory (the ROM 104, etc.) included in the information processing apparatus 101, a hash value read from a terminal to which the information processing apparatus 101 has ever connected by Bluetooth® Low Energy in the past. Thus, in step S1306, the information processing apparatus 101 compares the hash value read in step S1305 with hash values read in the past (hash values stored in the memory included in the information processing apparatus 101), and determines whether the read hash value matches any of the stored hash values. In other words, the information processing apparatus 101 determines whether the communication apparatus 151 is a terminal to which the information processing apparatus 101 has ever connected by Bluetooth® Low Energy in the past. At this time, the information processing apparatus 101 may add, to a determination condition, not only hash values but also other types of information such as individual identification information including a MAC address of the communication apparatus 151.

In a case where it is determined in step S1306 that the read hash value is not stored in the memory (NO in step S1306), the information processing apparatus 101 continues discovery for identifying remaining configurations of GATT data of the communication apparatus 151. Thus, in step S1307, the information processing apparatus 101 transmits, to the communication apparatus 151, a discovery request for requesting information indicating the configuration of GATT data of the communication apparatus 151. In step S1308, the communication apparatus 151 that has received the request transmits information indicating the configuration of GATT data to the information processing apparatus 101. The transmission and the reception of a discovery request and the transmission and the reception of information indicating the configuration of GATT data are repeated a certain number of times corresponding to the number of services, characteristics, or descriptors in GATT data. Thus, in step S1309, the transmission and the reception of a discovery request and the transmission and the reception of information indicating the configuration of GATT data are repeated until the transmission of all pieces of information indicating the configuration of GATT data is completed.

If the transmission of all pieces of information indicating the configuration of GATT data is completed, in step S1310, the information processing apparatus 101 stores the configuration of GATT data of the communication apparatus 151 into a memory included in the information processing apparatus 101, as a cache. At this time, the information processing apparatus 101 stores the cache of the configuration of GATT data of the communication apparatus 151 and a hash value obtained from the communication apparatus 151 into the memory in association with each other. In addition, the information processing apparatus 101 may further store other types of information such as individual identification information including a MAC address of the communication apparatus 151 into the memory in association with the cache.

If it is determined in step S1306 that the read hash value is stored in the memory (YES in step S1306), because the configuration of GATT data of the communication apparatus 151 has already been cached, the information processing apparatus 101 may omit the processing in steps S1307 to S1310.

By acquiring the configuration of GATT data of the communication apparatus 151, it becomes possible for the information processing apparatus 101 to execute arbitrary type of GATT communication with the communication apparatus 151 thereafter. Thus, in step S1311, the information processing apparatus 101 executes arbitrary type of GATT communication with the communication apparatus 151.

After the GATT communication is completed, in step S1312, the information processing apparatus 101 transmits a release request. In step S1313, the communication apparatus 151 that has received the release request transmits a release response, and Bluetooth® Low Energy connection between the apparatuses ends. If Bluetooth® Low Energy connection between the apparatuses ends, the information processing apparatus 101 and the communication apparatus 151 respectively return to a scanner and an advertiser, and the communication apparatus 151 restarts the transmission of advertising information.

The above description has been given of an example in which the communication apparatus 151 functions as an advertiser and the information processing apparatus 101 functions as a scanner. Nevertheless, in the present exemplary embodiment, opposite roles can also be applied to the apparatuses. More specifically, the information processing apparatus 101 may function as an advertiser and the communication apparatus 151 may function as a scanner.

(Wi-Fi Communication Via Bluetooth® Low Energy Communication)

The description will now be given of a sequence of performing the connection of Wi-Fi which is higher-speed communication than Bluetooth® Low Energy, by Bluetooth® Low Energy communication which is low-speed communication. FIG. 13 is a sequence diagram illustrating processing in which the information processing apparatus 101 and the communication apparatus 151 perform network connection using a Bluetooth® Low Energy communication method. In the present exemplary embodiment, the description will be given of an example case where a job is transmitted and received by handover. The handover is a technique in which apparatuses that perform communication initially exchange connection information for performing communication using a high-speed communication method, using a near field communication method (low-speed communication method), and then switch the commination method to the high-speed communication method, and transmit and receive data.

In the present exemplary embodiment, Bluetooth® Low Energy is used as the near field communication method and Wi-Fi is used as the high-speed communication method. The communication speed of GATT communication (bidirectional communication enabled by establishing Bluetooth® Low Energy connection between apparatuses) is lower than that of Wi-Fi communication. Thus, by performing authentication between apparatuses and communication of connection information necessary for Wi-Fi communication via GATT communication, and transferring large-volume data (job in this example) via Wi-Fi communication with high communication speed, efficient data transfer can be performed. The communication methods used in the handover are not limited to the above-described configuration, and various communication methods may be used as the near field communication method and the high-speed communication method. For example, connection information for Wi-Fi communication may be exchanged via near field communication (NFC) or Wi-Fi Aware communication, and then, data may be exchanged via Wi-Fi communication.

The processing of the communication apparatus 151 indicated by the processing sequence is implemented by the CPU 154 loading a control program stored in the ROM 152 or an HDD (not illustrated) included in the communication apparatus 151, onto the RAM 153, and executing the control program. The processing of the information processing apparatus 101 that is indicated by the processing sequence is implemented by the CPU 103 loading a control program stored in the ROM 104 or an HDD (not illustrated) included in the information processing apparatus 101, onto the RAM 105, and executing the control program.

In the following description, the communication apparatus 151 functions an advertiser that transmits advertising information at predetermined intervals. In addition, the information processing apparatus 101 functions as a scanner that waits for advertising information to be transmitted from a nearby advertiser.

First, in steps S1001 to S1003, the near field communication unit 157 transmits advertising information. The information processing apparatus 101 can recognize the existence of the communication apparatus 151 by the near field communication unit 110 receiving the advertising information transmitted from the near field communication unit 157.

If the information processing apparatus 101 recognizes the communication apparatus 151 and determines to connect with the communication apparatus 151, the information processing apparatus 101 transmits connection request information to the communication apparatus 151. Specifically, in step S1004, the near field communication unit 110 transmits CONNECT_REQ which is a request for transitioning to a connection event of establishing network connection by Bluetooth® Low Energy. When the near field communication unit 157 receives the CONNECT_REQ, the information processing apparatus 101 and the communication apparatus 151 prepare for transitioning to the connection event. Specifically, the near field communication unit 110 and the near field communication unit 157 respectively notify the CPU 103 and the CPU 154 that connection processing for GATT communication has been completed. Then, the information processing apparatus 101 and the communication apparatus 151 respectively transition to a master and a slave from the scanner and the advertiser, and the information processing apparatus 101 functioning as a master and the communication apparatus 151 functioning as a slave establish connection (Bluetooth® Low Energy connection) for GATT communication. In the Bluetooth® Low Energy standard, a master can form a "one-to-many" star-shaped topology with slaves. After establishing the Bluetooth® Low Energy connection, the information processing apparatus 101 and the communication apparatus 151 can perform data communication thereafter using a GATT communication method. The processing in steps S1001 to S1004 is similar to the processing in steps S1301 to S1304 in FIG. 12. After establishing the Bluetooth® Low Energy connection, the communication apparatus 151 may stop advertising or switch the content of advertising information to be transmitted. Specifically, the communication apparatus 151 may switch advertising information from advertising information (ADV_IND) for which a received apparatus can transmit a connection request, to advertising information (ADV_SCAN_IND or ADV_NONCONN_IND) for which a received apparatus cannot transmit a connection request. In FIG. 12, the processing in steps S1307 to S1310 is executed after the execution of the processing in steps S1305 and S1306 is executed, and GATT communication is executed in step S1311, but the processing is omitted in FIG. 13.

In step S1005, the near field communication unit 110 requests information regarding a communication protocol supported by the communication apparatus 151, from the near field communication unit 157 via GATT communication. The request includes information regarding a communication protocol supported by the information processing apparatus 101. By receiving the request, the near field communication unit 157 can recognize that the information processing apparatus 101 supports a communication method such as Wi-Fi.

In step S1006, the near field communication unit 157 transmits, via GATT communication, information regarding a communication protocol the near field communication unit 157 supports, in response to the request received in step S1005. The apparatuses can thereby recognize communication protocols supported by the apparatuses besides Bluetooth® Low Energy.

As a result of recognizing the communication protocols supported by the apparatuses besides Bluetooth® Low Energy, the information processing apparatus 101 may determine to switch the communication between the apparatuses to Wi-Fi communication. The determination of whether to switch a communication method may be made by the communication apparatus 151 as well.

In a case where the switching of the communication method is determined, in steps S1007 and S1008, the apparatuses exchange connection information necessary for performing Wi-Fi communication, such as information regarding an address for identifying a communication partner, and information regarding an SSID. Then, in step S1009, the near field communication unit 110 transmits a request (communication switching request) for switching a method of communication between the apparatuses from GATT communication to Wi-Fi communication. When the near field communication unit 157 receives the switching request, in step S1010, the near field communication unit 157 transmits a response.

If the switching request and the switching response are correctly transmitted, in step S1011, the information processing apparatus 101 switches a communication unit to be used for communication with the communication apparatus 151, from the near field communication unit 110 to the communication unit 109.

Furthermore, in step S1012, the communication apparatus 151 switches a communication unit to be used for communication with the information processing apparatus 101, from the near field communication unit 157 to the communication unit 156. After the switching is performed, in step S1013, the near field communication unit 110 transmits a release request. In step S1014, the near field communication unit 157 that has received the release request transmits a release response, and Bluetooth® Low Energy connection between the apparatuses ends. If Bluetooth® Low Energy connection between the apparatuses ends, the information processing apparatus 101 and the communication apparatus 151 respectively return to a scanner and an advertiser, and the near field communication unit 157 restarts the transmission of advertising information.

Then, using the information necessary for performing Wi-Fi communication that has been exchanged in steps S1007 and S1008, the apparatuses perform Wi-Fi communication. In step S1015, the communication unit 109 asks the communication unit 156 whether the communication apparatus 151 can acquire a job. For example, information regarding a free space for temporarily storing image data to be transferred to the communication apparatus 151 is checked. After receiving a confirmation request, in step S1016, the communication unit 156 transmits a response to the confirmation request.

If a correct response is acquired and it is determined that the communication apparatus 151 can acquire a job, in step S1017, the communication unit 156 requests a job. Then, in step S1018, the communication unit 109 that has received the job request transmits, to the communication unit 156, a job including image data existing in the information processing apparatus 101. The selection of a job to be transmitted at this time is performed at a timing such as a timing before Bluetooth® Low Energy connection is established, a timing after Bluetooth® Low Energy connection is established, or a timing after Wi-Fi connection is established. A job to be transmitted is not limited to a print job, and may be a scan job for issuing a scan instruction to the communication apparatus 151, or a job for the information processing apparatus 101 acquiring information regarding the state of the communication apparatus 151, for example. For example, a job to be transmitted may be a command for executing various operations on the communication apparatus 151, such as a change of the setting of the communication apparatus 151. In a case where the communication apparatus 151 is an imaging apparatus such as a camera, the communication apparatus 151 may transmit image data obtained by image capturing performed by the camera, to the information processing apparatus 101 such as a smartphone via Wi-Fi communication. When the communication apparatus 151 is a music reproduction device, sound data may be transmitted from the information processing apparatus 101 such as a smartphone to the music reproduction device via Wi-Fi communication.

When the transmission of a job is completed, the information processing apparatus 101 disconnects Wi-Fi connection with the communication apparatus 151, and returns to a network state caused immediately before handover. Specifically, for example, if the information processing apparatus 101 had been connected to a mobile communication network such as 3G or LTE, or an access point such as a router before executing handover, the information processing apparatus 101 reestablishes connection to the mobile communication network or the access point. Before executing handover, the information processing apparatus 101 therefore holds information regarding a network state caused immediately before handover, and connection information necessary for establishing the network state.

In this manner, by using the handover technique, connection information for performing communication using a high-speed communication method can be exchanged using a communication method (near field communication method) with high usability, and then, large-volume data can be exchanged at high speed using the high-speed communication method. If a communication method is switched from GATT communication to Wi-Fi communication by the handover, Bluetooth® Low Energy connection between apparatuses is disconnected. The near field communication unit 157 therefore restarts the transmission of advertising information.

The above description has been given of an example in which the communication apparatus 151 functions as an advertiser and the information processing apparatus 101 functions as a scanner. Nevertheless, in the present exemplary embodiment, opposite roles can also be applied to the apparatuses. More specifically, the information processing apparatus 101 may function as an advertiser and the communication apparatus 151 may function as a scanner.
(Estimation of Absolute Position Information)

Next, an estimation method of absolute position information that uses a position detection function of Bluetooth 5.1 will be described. There is a case where a simple device not including a GPS receiving unit desires to recognize an absolute position of the device itself. In this case, the simple device can recognize an absolute position of the simple device using an absolute position of a processing apparatus including a GPS receiving unit that has been acquired by the processing apparatus using the GPS, and a relative positional relationship between the processing apparatus and the simple device. Hereinafter, the details will be described.

Figure 14B:
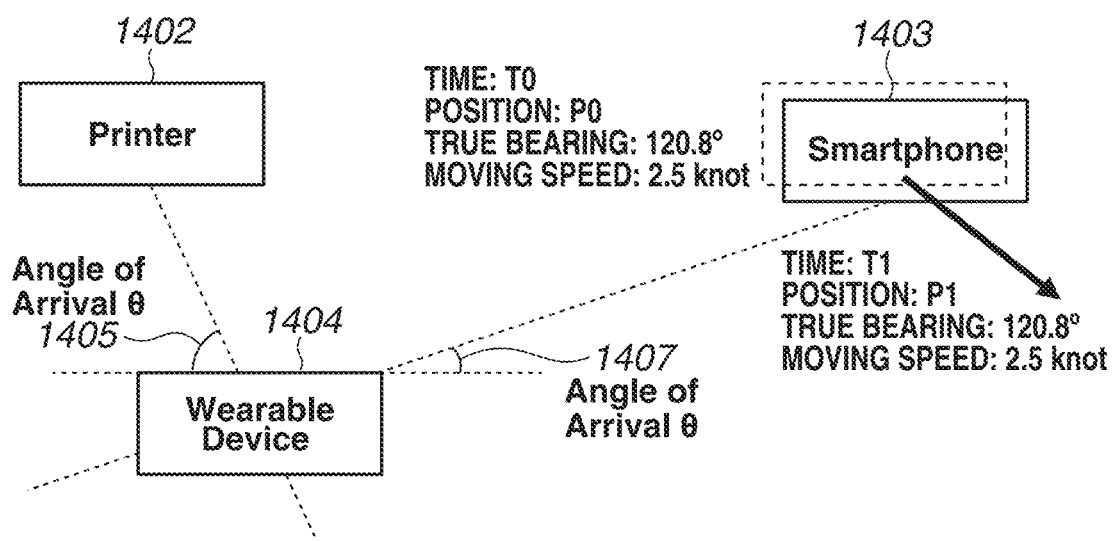

FIGS. 14A and 14B are diagrams illustrating an example of an apparatus that supports the Bluetooth® Low Energy standard of Bluetooth 5.1, and a GPS satellite. In FIG. 14A, the GPS satellite 1401 is a GPS satellite constituting a part of the global positioning system. While a plurality of GPS satellites is actually operating in midair, FIG. 14A illustrates one of the plurality of GPS satellites.

A smartphone 1403 being a processing apparatus including a GPS receiving unit can receive signals from several GPS satellites existing in midair by the GPS receiving unit, and recognize the current position of the smartphone 1403. The smartphone 1403 includes the configurations of the information processing apparatus 101 illustrated in FIG. 1.

A printer 1402 does not include a GPS receiving unit, but installation position information and installation elevation information are pre-registered in a memory of the printer 1402. The printer 1402 includes the configurations of the communication apparatus 151 illustrated in FIG. 1. Examples of expected installation locations of the printer 1402 include the inside of a convenience store, the inside of an office, and the inside of a room of a home.

A wearable device 1404 is a device to be used by being attached to a body, like a wristwatch and goggles. The wearable device 1404 includes configurations basically similar to the configurations of the information processing apparatus 101 illustrated in FIG. 1, but does not include the GPS receiving unit 112.

In the present exemplary embodiment, the description will be given of an example in which the printer 1402 and the smartphone 1403 function as a Bluetooth® Low Energy advertiser (hereinafter, also referred to as an "advertiser device"), and the wearable device 1404 functions as a Bluetooth® Low Energy scanner (hereinafter, also referred to as a "scanner device").

In FIG. 14A, at the time point of a time T0, the smartphone 1403 exists at a position P0 and is moving in the direction of true bearing of 120.8° at a moving speed of 2.5 knot (=4.63 kilometer/h). In addition, the smartphone 1403 can receive a signal from the GPS satellite 1401 by the built-in GPS receiving unit 112, and recognize the current position of the smartphone 1403. An angle of arrival θ 1405 is an angle of arrival θ calculated based on an AoA radio signal received by the wearable device 1404 from the printer 1402. An angle of arrival θ 1406 is an angle of arrival θ calculated based on an AoA radio signal received by the wearable device 1404 from the smartphone 1403.

The description will be given of a case where only one Bluetooth® Low Energy advertiser device (e.g., only the smartphone 1403) exists near the wearable device 1404 at the time point of the time T0 illustrated in FIG. 14A. At this time, the wearable device 1404 can estimate the current position of itself based on the current position information and the current elevation information of the smartphone 1403, the angle of arrival θ 1406, and radio field intensity of advertising information (scan_response). The current position information is position information regarding at least any of current latitude, longitude, information regarding north latitude/south latitude, or information regarding east longitude/west longitude. The current elevation information is elevation information regarding the current elevation (above sea level).

In FIG. 14A, the wearable device 1404 can obtain the angle of arrival θ 1406 using Formula (1) based on advertising information received by the wearable device 1404 from the smartphone 1403. In other words, the wearable device 1404 can estimate an angle between the wearable device 1404 and the smartphone 1403. Furthermore, the wearable device 1404 can estimate a distance between the wearable device 1404 and the smartphone 1403 based on radio field intensity of the received advertising information. Specifically, the distance between the smartphone 1403 and the wearable device 1404 can be estimated based on the radio field intensity of the received advertising information using a table (to be described below with reference to FIG. 21) indicating a relationship between radio field intensity and a distance.

Thus, a position away from the smartphone 1403 by the estimated distance in the direction of the estimated angle is the estimated current position of the wearable device 1404. More specifically, in FIG. 14A, a position on a broken line starting from the smartphone 1403 and forming the angle of arrival θ 1406 away from the position of the smartphone 1403 by the estimated distance is the estimated current position of the wearable device 1404.

The elevation can be estimated based on the current elevation information of the smartphone 1403. Typically, the same elevation information can be set as elevation information of the smartphone 1403 and elevation information of the wearable device 1404.

In this manner, the wearable device 1404 can obtain absolute position information of the wearable device 1404 based on position information of a nearby apparatus (Bluetooth® Low Energy advertiser device) that is included in advertising information from the apparatus.

Next, the description will be given of a case where a plurality of Bluetooth® Low Energy advertiser devices (e.g., the printer 1402 and the smartphone 1403) exist near the wearable device 1404 at the time T0 illustrated in FIG. 14A. At this time, the wearable device 1404 can estimate the current position of itself based on the installation position information and the installation elevation information of the printer 1402, the angle of arrival θ 1405, the current position information and the current elevation information of the smartphone 1403, and the angle of arrival θ 1406. The installation position information and the installation elevation information of the printer 1402 is pre-registered in the printer 1402. The details of the registration processing will be described below with reference to FIG. 19.

In FIG. 14A, the wearable device 1404 can obtain the angle of arrival θ 1405 using Formula (1) based on advertising information received by the wearable device 1404 from the printer 1402. Furthermore, the wearable device 1404 can obtain the angle of arrival θ 1406 using Formula (1) based on advertising information received by the wearable device 1404 from the smartphone 1403. In other words, the wearable device 1404 can estimate an angle between the wearable device 1404 and the printer 1402, and an angle between the wearable device 1404 and the smartphone 1403.

Furthermore, the wearable device 1404 can estimate a distance between the wearable device 1404 and the printer 1402 based on the radio field intensity of the advertising information received from the printer 1402. The wearable device 1404 can estimate a distance between the wearable device 1404 and the smartphone 1403 based on the radio field intensity of the advertising information received from the smartphone 1403 and the table illustrated in FIG. 21.

Thus, an intersection point (region 2603 to be described below with reference to FIG. 26A) of a broken line starting from the printer 1402 and forming the angle of arrival θ 1405, and a broken line starting from the smartphone 1403 and forming the angle of arrival θ 1406 is the estimated current position of the wearable device 1404. The elevation can be estimated based on the installation elevation information.

In this manner, by using advertising information from a plurality of nearby apparatuses (Bluetooth® Low Energy advertiser devices), the wearable device 1404 can obtain more accurate absolute position information, which is desirable. In particular, the accuracy of a distance estimated based on radio field intensity lowers as a distance of a Bluetooth® Low Energy advertiser device from a Bluetooth® Low Energy scanner device becomes larger. Although an error of an angle of arrival θ becomes larger as a distance from a Bluetooth® Low Energy advertiser device becomes larger, an error at the same distance is smaller as compared with radio field intensity and the accuracy is considered to be higher than radio field intensity. In such a case, the current position of the wearable device 1404 can be calculated and estimated with higher accuracy when a plurality of Bluetooth® Low Energy advertiser devices exists nearby as compared with a case where only one Bluetooth® Low Energy advertiser device exists nearby.

Heretofore, a basic concept of a position detection method according to the present exemplary embodiment has been described. It should be noted that a relative positional relationship between the wearable device 1404 and the smartphone 1403 can vary. A case where the smartphone 1403 is moving will be described with reference to FIG. 14B.

FIG. 14B illustrates a positional relationship between the apparatuses at the time point of a time T1. In FIG. 14B, a dotted-line rectangle near the smartphone 1403 indicates the position of the smartphone 1403 at the time point of the time T0 illustrated in FIG. 14A. A solid-line rectangle of the smartphone 1403 indicates the position of the smartphone 1403 at the time point of the time T1. At the time T1, the smartphone 1403 exists at a position P1 and is moving in the direction of true bearing of 120.8° at a moving speed of 2.5 knot (=4.63 kilometer/h). An angle of arrival θ 1407 is an angle of arrival θ calculated based on an AoA radio signal received by the wearable device 1404 from the smartphone 1403.

A processing time is considered to be required since the time when the smartphone 1403 acquires current position information of the smartphone 1403 from the GPS receiving unit 112, to the time when the smartphone 1403 transmits advertising information (scan_response) to the wearable device 1404. For example, it is assumed that the wearable device 1404 is stationary at the time point of the time T0, the smartphone 1403 acquires the current position information at the time T0, and the smartphone 1403 transmits advertising information at the time T1. If the time T1 is one second after the time T0, the processing time is one second.

The wearable device 1404 receives the advertising information (scan_response) from the smartphone 1403 at the time T1, but information regarding a current position that is included in the received advertising information is a current position acquired at the time point of the time T0. The wearable device 1404 accordingly needs to perform correction corresponding to the movement amount of the smartphone 1403 for calculating the accurate position of itself.

In view of the foregoing, when the advertising information (scan_response) from the smartphone 1403 includes information regarding a moving speed and true bearing information, the wearable device 1404 calculates the position P1 moved from the current position in the true bearing direction for one second. Specifically, an intersection point (region 2603 to be described below with reference to FIG. 26A) of a broken line starting from the printer 1402 and forming the angle of arrival θ 1405, and a broken line starting from the smartphone 1403 existing at the calculated position P1 and forming the angle of arrival θ 1407 is the calculated estimated current position of the wearable device 1404. The elevation can be estimated based on the current elevation information.

In this manner, when advertising information from a nearby apparatus includes a moving speed of the apparatus and true bearing information, the wearable device 1404 can obtain more accurate absolute position information of the wearable device 1404, which is desirable.

Figure 26A:
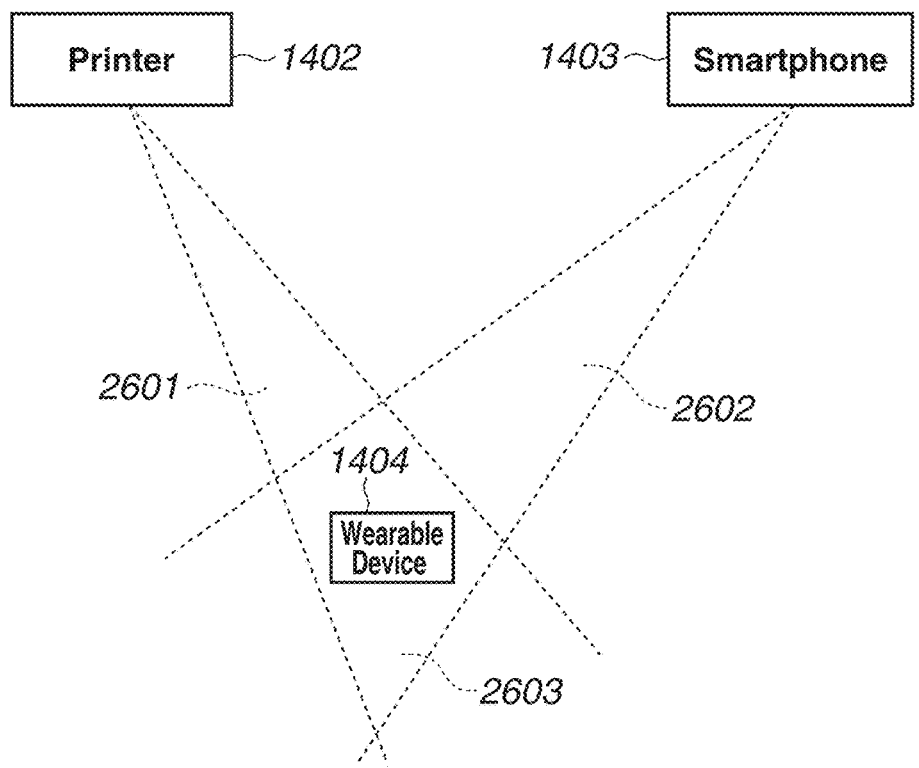
FIGS. 26A and 26B are diagrams each illustrating an example of a region covered by an angle of arrival θ of a Bluetooth® Low Energy device.
Figure 26B:
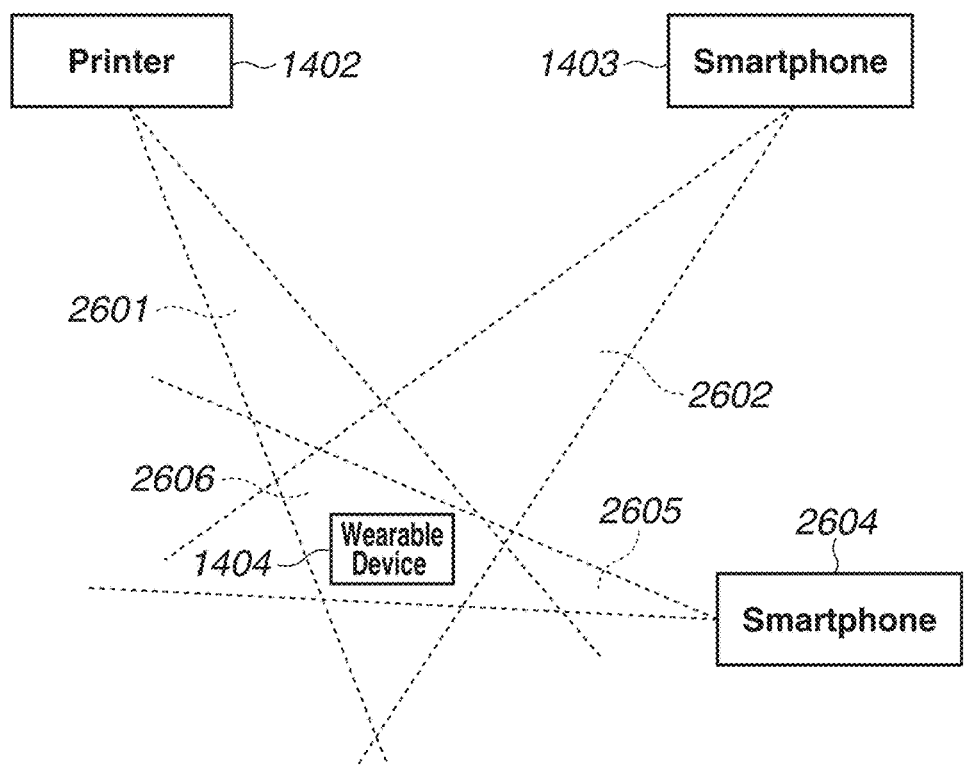

The reason why advertising information from a plurality of Bluetooth® Low Energy advertiser devices is desirably used will now be described in detail. FIGS. 26A and 26B are diagrams each illustrating an example of a region covered by an angle of arrival θ of advertising information transmitted by a Bluetooth® Low Energy advertiser device. In FIGS. 26A and 26B, the printer 1402, the smartphone 1403, and the wearable device 1404 are the same as those illustrated in FIG. 14. In FIG. 26A, an angle of arrival θ region 2601 is a region covered by angles of arrival θ of advertising information received by the wearable device 1404 from the printer 1402. An angle of arrival θ region 2602 is a region covered by angles of arrival θ of advertising information received by the wearable device 1404 from the smartphone 1403. The wearable device 1404 includes the near field communication unit 110 illustrated in FIG. 1, and the near field communication unit 110 includes the three antennas 601, 602, and 603 illustrated in FIG. 6. The errors of the angles of arrival θ calculated based on AoA radio signals received by these antennas become larger as a distance from the printer 1402 or the smartphone 1403 becomes larger. In other words, the angles of arrival θ cover regions such as the angle of arrival θ region 2601 and the angle of arrival θ region 2602. The region 2603 is a region covered by both of the angle of arrival θ region 2601 and the angle of arrival θ region 2602, and the wearable device 1404 can be calculated to exist in the region 2603.

In FIG. 26B, an angle of arrival θ region 2605 is a region covered by angles of arrival θ calculated based on AoA radio signals received by the wearable device 1404 from a smartphone 2604. The wearable device 1404 includes the near field communication unit 110 illustrated in FIG. 1, and the near field communication unit 110 includes the three antennas 601, 602, and 603 illustrated in FIG. 6. The errors of the angles of arrival θ calculated based on AoA radio signals received by these antennas become larger as a distance from the smartphone 2604 becomes larger. In other words, the angles of arrival θ cover a region such as the angle of arrival θ region 2605. A region 2606 is a region covered by all of the angle of arrival θ region 2601, the angle of arrival θ region 2602, and the angle of arrival θ region 2605. The wearable device 1404 can be calculated to exist in the region 2606.

In the case illustrated in FIG. 26B, in addition to the angle of arrival θ regions 2601 and 2602 calculated based on AoA radio signals from the printer 1402 and the smartphone 1403, the angle of arrival θ region 2605 calculated based on AoA radio signals from the smartphone 2604 is also used. Then, the region 2606 covered by all of the regions 2601, 2602, and 2605 is calculated. Thus, the current position of the wearable device 1404 can be calculated and estimated with higher accuracy in the case illustrated in FIG. 26B as compared with the case illustrated in FIG. 26A. FIG. 26B illustrates an example in which three Bluetooth® Low Energy advertiser devices corresponding to the printer 1402, the smartphone 1403, and the smartphone 2604, and a Bluetooth® Low Energy scanner device corresponding to the wearable device 1404 are included. Nevertheless, the configuration is not limited to this example. As the number of Bluetooth® Low Energy advertiser devices increases, the current position of the wearable device 1404 can be calculated and estimated with higher accuracy.

(Registration of Installation Information)

The description will now be given of registration processing of pre-registering an installation position and an installation elevation in a Bluetooth® Low Energy advertiser device such as the printer 1402. FIG. 19 is a schematic diagram illustrating an example of an installation information registration screen. In FIG. 19, an installation information registration screen 1901 is a screen for registering an installation position and an installation elevation of the communication apparatus 151 such as the printer 1402, and is displayed on the display unit 158 of the communication apparatus 151. The user can register an installation position of the communication apparatus 151 in a DEG format into an installation position registration portion 1902. The unit of an installation position in registration is "degree". The user can register an installation elevation of the communication apparatus 151 into an installation elevation registration portion 1903. The unit of an installation elevation in registration is "meter". Using the software keyboard function and the touch panel of the display unit 158, the user can register an installation position and an installation elevation of the communication apparatus 151 into the installation position registration portion 1902 and the installation elevation registration portion 1903. Installation position information and installation elevation information are stored into the RAM 153. FIG. 19 illustrates an example in which the printer 1402 serving as an example of the communication apparatus 151 is installed at the position of 35.51 degrees (35 degrees 30. 600 minutes north latitude), and at the elevation of 633 meters.

(Display of Position Guidance)

Figure 20A:
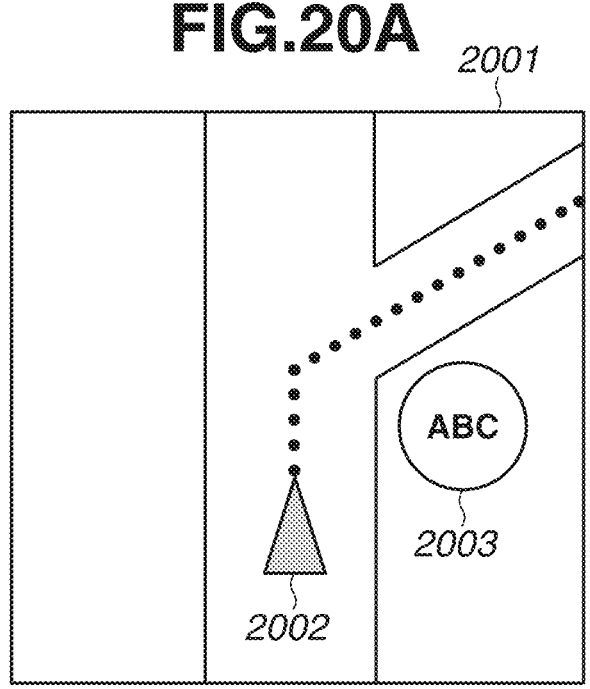
FIGS. 20A and 20B are schematic diagrams each illustrating an example of a route guidance application that uses a wearable device (wristwatch, goggles).
Figure 20B:
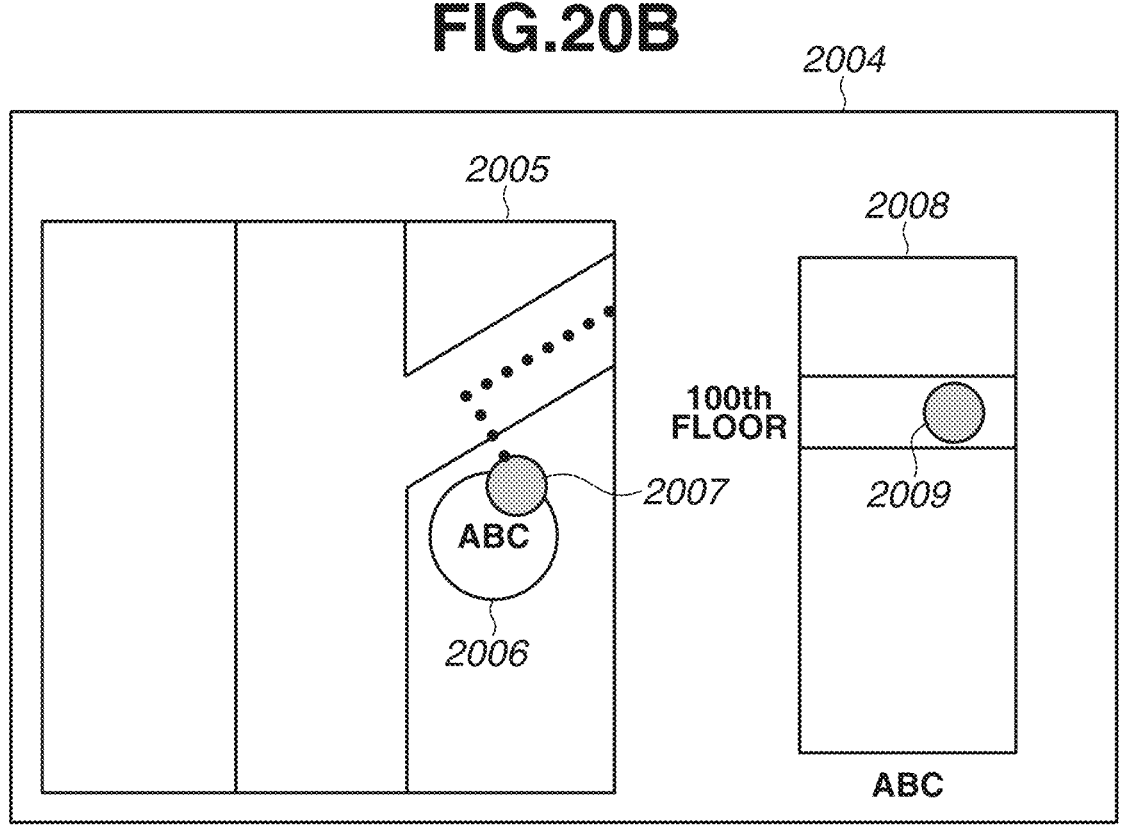

Next, an example of displaying the position of the wearable device 1404 on a map will be described. FIGS. 20A and 20B are schematic diagrams each illustrating a display example of a route guidance application that uses the wearable device 1404. FIG. 20A is a schematic diagram illustrating a display example in a case where a wristwatch (smart watch) is used as a wearable device. A route guidance application 2001 is an application that displays the current position and the travelling direction of a wearable device (wristwatch) or the user wearing the wearable device, a route to a destination, and a time required for reaching the destination. Based on current position information of the wearable device 1404, and map information acquired by the route guidance application 2001 from an external device (not illustrated) such as a server, the wearable device 1404 can display a position guidance screen as illustrated in FIG. 20A. In a case where the route guidance application 2001 prestores map information, the prestored map information may be used.

By using the route guidance application 2001, the user can recognize the current position of oneself, a route and directions to a destination, a required time, and an arrival time. A current position display 2002 indicates the current position of the wearable device (wristwatch) or the user wearing the wearable device. When the wearable device or the user is travelling, the current position display 2002 displays the current position in an isosceles triangle, and when the wearable device or the user is stationary, the current position display 2002 displays the current position in a circle. When the wearable device or the user is travelling, a sharp angle portion of the current position display 2002 indicates a travelling direction. FIG. 20A illustrates a state where the wearable device or the user is travelling. A building display 2003 indicates a nearby building, and FIG. 20A illustrates an example of a building of an ABC company. A dotted line indicates a route.

FIG. 20B is a schematic diagram illustrating a display example in a case where goggles are used as the wearable device 1404. A route guidance application 2004 is an application that displays the current position and the travelling direction of a wearable device (goggles) or the user wearing the wearable device, a route to a destination, and a time required for reaching the destination. Based on current position information and current elevation information of the wearable device 1404, and map information acquired by the route guidance application 2004 from an external device such as a server, the wearable device 1404 can display a position guidance screen as illustrated in FIG. 20B. In a case where the route guidance application 2004 prestores map information, the prestored map information may be used.

By using the route guidance application 2004, the user can recognize the current position of oneself, a route and directions to a destination, a required time, and an arrival time. A route display portion 2005 displays the current position and the travelling direction of a wearable device (goggles) or the user wearing the wearable device, a route to a destination, and a time required for reaching the destination. In the route display portion 2005, a state seen from above is displayed. A building display portion 2008 displays a current position in a building at which a wearable device (goggles) or the user wearing the wearable device exists. A building display 2006 indicates a building where the wearable device (goggles) or the user wearing the wearable device exists, and FIG. 20B illustrates an example of a building of an ABC company. FIG. 20B illustrates a state where the wearable device (goggles) or the user wearing the wearable device exists on the 100th floor. A floor number in the building is estimated based on the current elevation information and building information (including height information of one floor) included in the map information. Current position displays 2007 and 2009 indicate the current position of the wearable device (goggles) or the user wearing the wearable device. When the wearable device or the user is travelling, the current position displays 2007 and 2009 display the current position in an isosceles triangle, and when the wearable device or the user is stationary, the current position displays 2007 and 2009 display the current position in a circle. When the wearable device or the user is travelling, sharp angle portions of the current position displays 2007 and 2009 indicate a travelling direction. FIG. 20B illustrates a state where the wearable device or the user is stationary.
(Table of Radio Field Intensity and Distance)

Next, a table to be used by the wearable device 1404 for obtaining a distance from a Bluetooth® Low Energy advertiser device will be described. FIG. 21 is a diagram illustrating an example of a table indicating radio field intensity, a radio field intensity level, and an estimated distance. In FIG. 21, the "radio field intensity" (unit: dBm) indicates the intensity of radio waves of advertising information received by the wearable device 1404 from a Bluetooth® Low Energy advertiser device such as the printer 1402 or the smartphone 1403. The "radio field intensity level" indicates a level of the radio field intensity defined in five intensity levels of radio waves. In this example, the levels are defined as 1 (lowest), 2, 3, 4, and 5 (highest) in ascending order of radio field intensity. The "estimated distance" indicates an estimated distance between the wearable device 1404 and a Bluetooth® Low Energy advertiser device that emits radio waves in each radio field intensity level. In the above-described example, a distance is estimated based on the radio field intensity using the table illustrated in FIG. 21, but the present exemplary embodiment is not limited to this. For example, in a case where transmission power (Tx Power 905) is included in a payload of received advertising information, the wearable device 1404 may use the value of the Tx Power. More specifically, based on the value of Tx Power and radio field intensity of received advertising information, propagation loss can be obtained, and a distance from a Bluetooth® Low Energy advertiser device can be estimated.
(Information Included in Advertising Information)

Next, information included in advertising information of a Bluetooth® Low Energy advertiser device will be described. FIG. 22 is a diagram illustrating an example of information to be set in advertising information (scan_response). The information illustrated in FIG. 22 is generated based on information acquired by the GPS receiving unit 112, and is prestored in a memory of a Bluetooth® Low Energy advertiser device. Then, when a Bluetooth® Low Energy advertiser device transmits advertising information, the information is stored into the payload 902 of advertising information, which has been described with reference to FIG. 5. In addition, aside from the information illustrated in FIG. 22, information such as identification information, on-board profile information, and transmission power (Tx Power) is stored in the payload 902.

In FIG. 22, a "name" is a name of each piece of information, a "symbol" is a symbol indicating each piece of information to be set in advertising information (scan_response), a "value" is a value of each piece of information, and a "unit (description)" indicates a unit and description of each piece of information. A "position" indicates a current position acquired by the GPS or a registered installation position. An "elevation" indicates a current elevation acquired by the GPS or a registered installation elevation. A "moving speed" and "true bearing" respectively indicate a current moving speed and information regarding true bearing.

FIG. 22 illustrates 35.51 degrees (35 degrees 30. 600 minutes north latitude) represented by the decimal notation in the DEG format as an example the "position", 333 meters as an example of the "elevation", 2.5 knot as an example of the "moving speed", and 120.8 degrees as an example of the "true bearing". By employing the decimal notation in the DEG format as a format representing the "position", it is possible to reduce an information amount (the number of characters). By reducing a data amount of an advertising packet (scan_response), it is possible to save the power consumption of a Bluetooth® Low Energy device. As illustrated in FIGS. 23A to 23C and 25A to 25D (second exemplary embodiment), the "symbol" and the "value" are stored in an advertising packet (scan_response).

The "symbol" illustrated in FIG. 22 is also used as an option of a scan_request in the second exemplary embodiment to be described below. A Bluetooth® Low Energy scanner device such as the wearable device 1404 can acquire the information illustrated in FIG. 22 from received advertising information (scan_response).
(Scan-Request and Scan-Response)

Next, the content in a scan_request and a scan_response will be described. FIGS. 23A to 23C are diagrams illustrating an example of a scan_request and a scan_response. When a Bluetooth® Low Energy advertiser device transmits an advertising packet (e.g., ADV_IND) and a Bluetooth® Low Energy scanner device receives the advertising packet, the Bluetooth® Low Energy scanner device transmits a scan_request. Specifically, when information included in the payload of the received advertising packet is insufficient, the Bluetooth® Low Energy scanner device transmits a scan_request to the advertiser device. If the advertiser device receives the scan_request, the advertiser device transmits a scan_response to the scanner device in response to the scan_request. In the following description, such a scan_response and an advertising packet are sometimes collectively abbreviated as an advertising packet (or advertising information).

FIG. 23A illustrates an example of a scan_request, and SCAN_REQ is a scan_request defined as the Bluetooth® Low Energy standard of Bluetooth 5.1. FIG. 23B illustrates an example of a scan_response, and illustrates an example of returning the "position" and the "elevation" illustrated in FIG. 22 to the wearable device 1404 as a scan_response to the scan_request. FIG. 23C illustrates an example of a scan_response, and illustrates an example of returning the "position", the "elevation", the "moving speed", and the "true bearing" illustrated in FIG. 22 to the wearable device 1404 as a scan_response to the scan_request. In FIGS. 23B and 23C, SCAN_RSP is a scan_response defined as the Bluetooth® Low Energy standard of Bluetooth 5.1. Pieces of information are described after SCAN_RSP, and it is defined in such a manner that pieces of information are separated by a comma ",", and the "symbol" and a value are separated by a colon ":".

The above-described example is an example in which a Bluetooth® Low Energy advertiser device stores the information illustrated in FIG. 22 into advertising information serving as a scan_response, but the present exemplary embodiment is not limited to this. For example, before a scan_request is transmitted from a Bluetooth® Low Energy scanner device, a Bluetooth® Low Energy advertiser device may store the information illustrated in FIG. 22 into advertising information being transmitted.

(Processing Flow of Bluetooth® Low Energy Advertiser Device)

FIGS. 15A and 15B are flowcharts each illustrating an example of processing in which a Bluetooth® Low Energy advertiser device transmits an advertising packet (scan_response). Programs related to the flowcharts illustrated in FIGS. 15A and 15B are stored in the ROM 104 or 152, for example, loaded into the RAM 105 or 153, and executed by the CPU 103 or 154.

FIG. 15A is a flowchart illustrating an example of processing in which the smartphone 1403 serving as a Bluetooth® Low Energy advertiser device transmits an advertising packet (scan_response) to the wearable device 1404 serving as a Bluetooth® Low Energy scanner device.

In step S1501, by receiving the scan_request illustrated in FIG. 23A that has been transmitted from the wearable device 1404, the smartphone 1403 starts the processing.

In step S1502, the smartphone 1403 acquires current position information indicated by the "position" illustrated in FIG. 22, from the GPS receiving unit 112.

In step S1503, the smartphone 1403 acquires current elevation information indicated by the "elevation" illustrated in FIG. 22, from the GPS receiving unit 112.

In step S1504, the smartphone 1403 acquires the current moving speed and true bearing information respectively indicated by the "moving speed" and the "true bearing" illustrated in FIG. 22, from the GPS receiving unit 112.

In step S1505, the smartphone 1403 sets (stores) the current position information, the current elevation information, and the current moving speed and true bearing information into an advertising packet (scan_response).

In step S1506, the smartphone 1403 transmits the advertising packet (scan_response) to the wearable device 1404.

In step S1507, the smartphone 1403 transmits all advertising packets (scan_responses), and then ends the transmission processing of an advertising packet (scan_response).

Through the above-described processing, a Bluetooth® Low Energy advertiser device transmits position information and the like of the Bluetooth® Low Energy advertiser device. FIG. 15A illustrates an example in which the current position information, the current elevation information, and the current moving speed and true bearing information are all included in the advertising packet (scan_response), but the present exemplary embodiment is not limited to this example. For example, only the current position information may be included in the advertising packet (scan_response). Alternatively, only the current position information and the current elevation information may be included in the advertising packet (scan_response). Alternatively, only the current position information may be included in an advertising packet to be transmitted before the reception of a scan_request, and the current elevation information may be included in an advertising packet to be transmitted as a scan_response.

FIG. 15B is a flowchart illustrating an example of processing in which the printer 1402 serving as a Bluetooth® Low Energy advertiser device transmits an advertising packet (scan_response) to the wearable device 1404 serving as a Bluetooth® Low Energy scanner device.

In step S1508, by receiving the scan_request illustrated in FIG. 23A that has been transmitted from the wearable device 1404, the printer 1402 serving as a Bluetooth® Low Energy advertiser device starts the processing.

In step S1509, the printer 1402 acquires installation position information registered via the installation position registration portion 1902 and stored in the RAM 153.

In step S1510, the printer 1402 acquires installation elevation information registered via the installation elevation registration portion 1903 and stored in the RAM 153.

In step S1511, the printer 1402 sets (stores) the installation position information and the installation elevation information into an advertising packet (scan_response).

In step S1512, the printer 1402 transmits an advertising packet (scan_response) to a Bluetooth® Low Energy scanner device such as the wearable device 1404.

In step S1513, the printer 1402 transmits all advertising packets (scan_responses), and then ends the transmission processing of an advertising packet (scan_response).

Through the above-described processing, a Bluetooth® Low Energy advertiser device transmits position information and the like of the Bluetooth® Low Energy advertiser device. FIG. 15B illustrates an example in which the installation position information and the installation elevation information are included in the advertising packet (scan_response), but the present exemplary embodiment is not limited to this example. For example, only the installation position information may be included in the advertising packet (scan_response). Alternatively, only the installation position information may be included in an advertising packet to be transmitted before the reception of a scan_request, and the installation elevation information may be included in an advertising packet to be transmitted as a scan_response.

The sequence of Bluetooth® Low Energy communication related to the flowcharts in FIGS. 15A and 15B is illustrated in the sequence diagram in FIG. 12. The wearable device 1404 corresponds to the information processing apparatus 101 illustrated in FIG. 12, the smartphone 1403 corresponds to the communication apparatus 151 illustrated in FIG. 12, and the printer 1402 corresponds to the communication apparatus 151 illustrated in FIG. 12. In this manner, the wearable device 1404 receives an advertising packet (scan_response) transmitted from the smartphone 1403 or the printer 1402.

(Processing Flow of Bluetooth® Low Energy Scanner Device)

Figure 16:
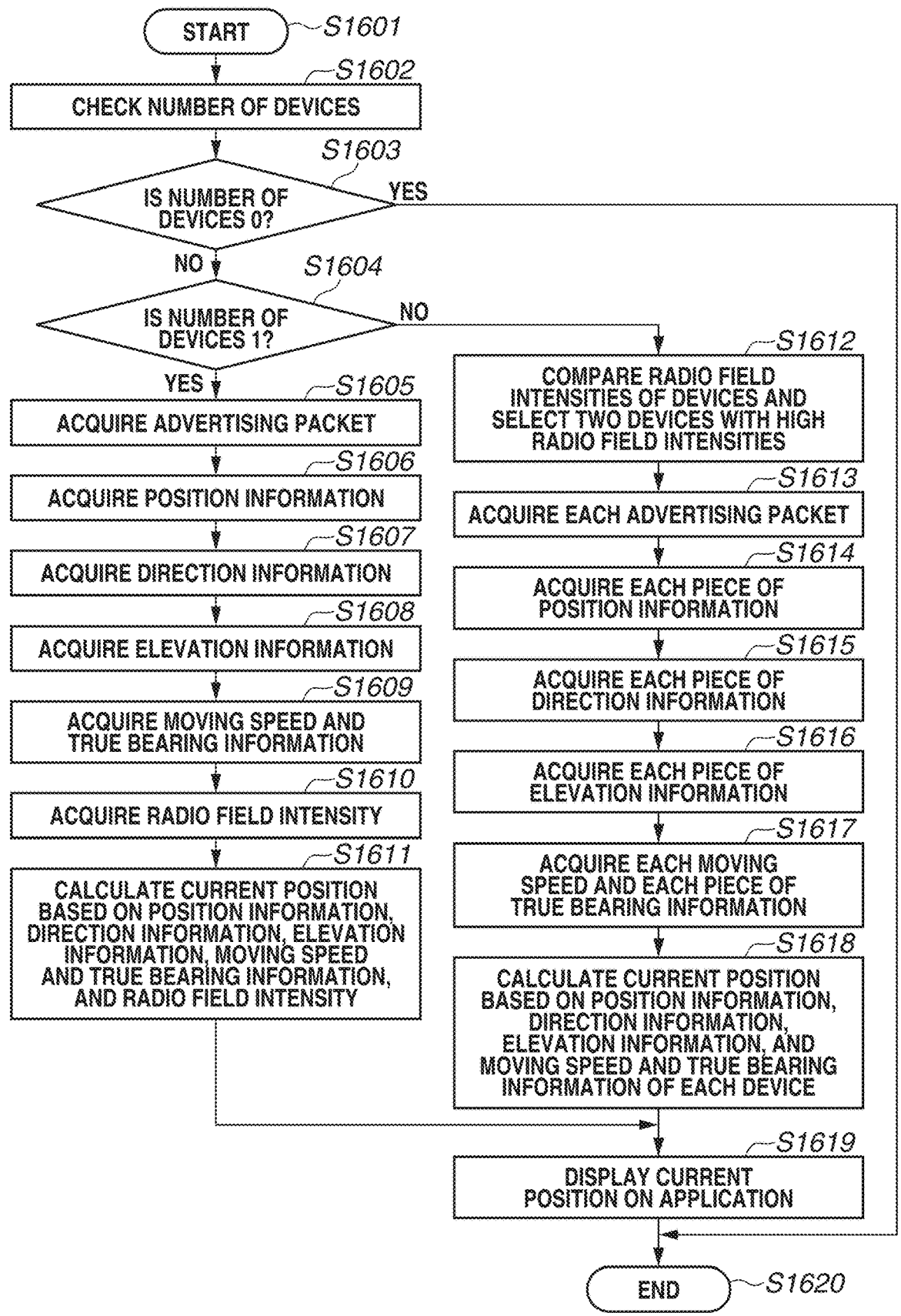
FIG. 16 is a flowchart illustrating an example of processing in which a Bluetooth® Low Energy scanner device displays a current position on an application.

FIG. 16 is a flowchart illustrating an example of processing in which a Bluetooth® Low Energy scanner device obtains a current position of itself and displays the current position on an application. A program related to the flowchart illustrated in FIG. 16 is stored in the ROM 104, for example, loaded onto the RAM 105, and executed by the CPU 103.

In step S1601, by receiving an advertising packet (scan_response) from a Bluetooth® Low Energy advertiser device such as the smartphone 1403 or the printer 1402, the wearable device 1404 serving as a Bluetooth® Low Energy scanner device starts the processing.

In step S1602, the wearable device 1404 determines the number of Bluetooth® Low Energy advertiser devices existing nearby, based on information in the received advertising packet (scan_response).

In step S1603, the wearable device 1404 determines whether the number of Bluetooth® Low Energy advertiser devices existing nearby is 0. If it is determined that the number of Bluetooth® Low Energy advertiser devices is 0 (YES in step S1603), the processing proceeds to step S1620. If it is determined that the number of Bluetooth® Low Energy advertiser devices is not 0 (1 or more) (NO in step S1603), the processing proceeds to step S1604.

In step S1604, the wearable device 1404 determines whether the number of Bluetooth® Low Energy advertiser devices existing nearby is 1. If it is determined that the number of Bluetooth® Low Energy advertiser devices is 1 (YES in step S1604), the processing proceeds to step S1605. If it is determined that the number of Bluetooth® Low Energy advertiser devices is larger than 1 (2 or more) (NO in step S1604), the processing proceeds to step S1612.

In step S1605, the wearable device 1404 acquires an advertising packet (scan_response).

In step S1606, the wearable device 1404 acquires position information indicating a current position or an installation position, from the advertising packet (scan_response) illustrated in FIG. 23B or 23C.

Figure 8:
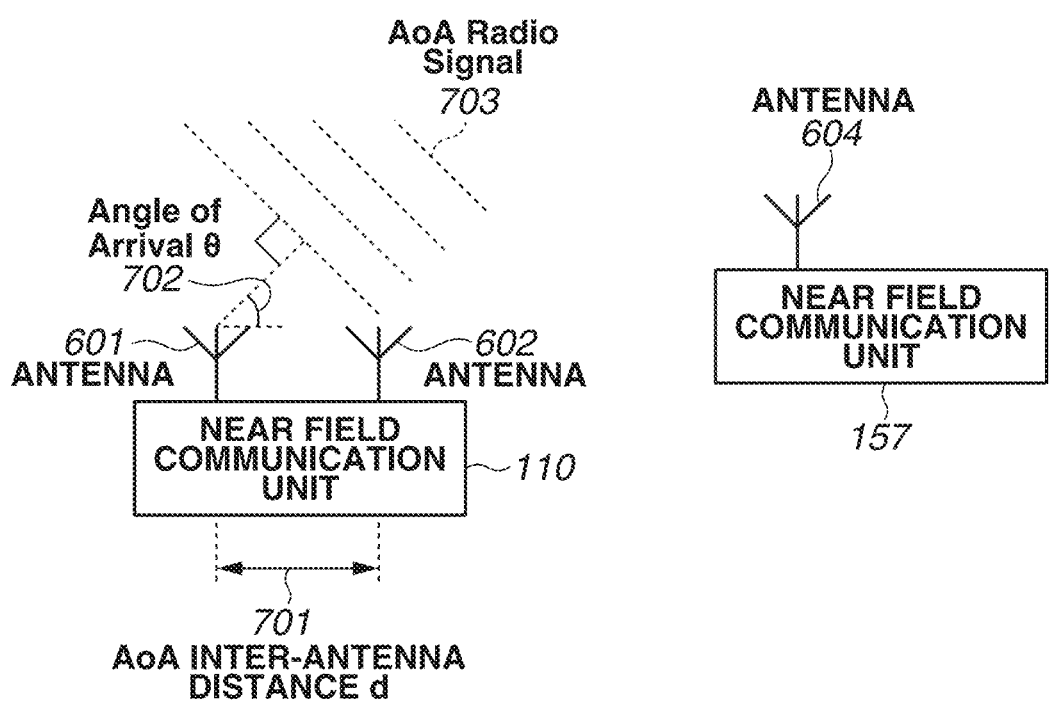
FIG. 8 is a schematic diagram illustrating a configuration including a plurality of antennas on an advertising reception side in detecting a direction in Bluetooth® Low Energy.

In step S1607, the wearable device 1404 calculates the angle of arrival θ 702 illustrated in FIG. 8, based on the advertising packet (scan_response) transmitted by the Bluetooth® Low Energy advertiser device. Then, the wearable device 1404 acquires direction information (information regarding an angle) of the Bluetooth® Low Energy advertiser device.

In step S1608, the wearable device 1404 acquires elevation information indicating a current elevation or an installation elevation, from the advertising packet (scan_response) illustrated in FIG. 23B or 23C.

In step S1609, the wearable device 1404 acquires a moving speed and true bearing information from the advertising packet (scan_response) illustrated in FIG. 23C.

In step S1610, the wearable device 1404 acquires the radio field intensity of the advertising packet (scan_response) received by the near field communication unit 110.

In step S1611, based on the position information, the direction information, the elevation information, the moving speed and true bearing information, and the radio field intensity, the wearable device 1404 calculates current position information of the wearable device 1404 as described with reference to FIG. 14A. The description has been given of an example in which the position information, the direction information, the elevation information, the moving speed and true bearing information, and the radio field intensity are used in step S1611, but the present exemplary embodiment is not limited to this example. For example, even in a case where none of the elevation information, the moving speed, and the true bearing information can be acquired, current position information may be calculated based on the position information, the direction information, and the radio field intensity.

In step S1612, the wearable device 1404 compares radio field intensities of advertising packets (scan_responses) of the Bluetooth® Low Energy advertiser devices existing nearby, and selects two Bluetooth® Low Energy advertiser devices with high radio field intensities.

In step S1613, the wearable device 1404 acquires advertising packets (scan_responses) of the two Bluetooth® Low Energy advertiser devices.

In step S1614, the wearable device 1404 acquires position information indicating a current position or an installation position of each of the two Bluetooth® Low Energy advertiser devices, from the advertising packet (scan_response) illustrated in FIG. 23B or 23C.

In step S1615, the wearable device 1404 calculates the angle of arrival θ 702 illustrated in FIG. 8, based on the advertising packets (scan_responses) transmitted from the two Bluetooth® Low Energy advertiser devices. The wearable device 1404 thereby acquires direction information (information regarding an angle) of each of the two Bluetooth® Low Energy advertiser devices.

In step S1616, the wearable device 1404 acquires elevation information indicating a current elevation or an installation elevation of each of the two Bluetooth® Low Energy advertiser devices, from the advertising packet (scan_response) illustrated in FIG. 23B or 23C.

In step S1617, the wearable device 1404 acquires a moving speed and true bearing information of each of the two Bluetooth® Low Energy advertiser devices from the advertising packet (scan_response) illustrated in FIG. 23C.

In step S1618, based on the position information, the direction information, the elevation information, and the moving speed and true bearing information of each of the two Bluetooth® Low Energy advertiser devices, the wearable device 1404 calculates current position information of the wearable device 1404 as described with reference to FIGS. 14A and 26A.

In step S1619, the wearable device 1404 displays the current position on the route guidance application 2001 or the route guidance application 2004 illustrated in FIG. 20A or 20B. Then, the processing proceeds to step S1620. In step S1620, the processing ends.

The description has been given of an example in which the position information, the direction information, the elevation information, and the moving speed and the true bearing information are used in step S1618, but the present exemplary embodiment is not limited to this example. For example, even in a case where none of the elevation information, the moving speed, and the true bearing information can be acquired, current position information may be calculated based on the position information and the direction information.

The description has been given of an example in which, in steps S1612 to S1618, the wearable device 1404 compares radio field intensities of advertising packets (scan_responses) of the Bluetooth® Low Energy advertiser devices existing nearby, and selects two Bluetooth® Low Energy advertiser devices with high radio field intensities, and then, the wearable device 1404 calculates the current position as described with reference to FIGS. 14A and 26A, based on the position information, the direction information, the elevation information, and the moving speed and the true bearing information of each of the two Bluetooth® Low Energy advertiser devices. Nevertheless, the present exemplary embodiment is not limited to this example. For example, in a case where three or more Bluetooth® Low Energy advertiser devices exist near the wearable device 1404 as illustrated in FIG. 26B, the current position of the wearable device 1404 may be calculated more accurately using these devices. Nevertheless, because processing load on the wearable device increases if the number of Bluetooth® Low Energy advertiser devices increases, it is important to appropriately perform design in accordance with the performance of the wearable device.

Through the above-described flow, a Bluetooth® Low Energy scanner device can acquire an absolute position (at least position information) of the Bluetooth® Low Energy scanner device without being equipped with a GPS receiver. In addition, display control of position guidance that uses a map can be implemented.

In the above-described example, direction information is acquired using an angle of arrival (AoA), but direction information may be acquired using an angle of departure (AoD).

Next, a second exemplary embodiment will be described. In the first exemplary embodiment, when transmitting a scan_response, an advertiser device always stores the information (at least position information) illustrated in FIG. 22 into a payload in the scan_response. In the second exemplary embodiment, only when information is requested, the information is stored into an advertising packet and the advertising packet is transmitted. This can reduce the power consumption of a Bluetooth® Low Energy device because required information is transmitted only when necessary. In the following description, the descriptions of parts described in the first exemplary embodiment will be omitted, and different points will be mainly described.

(Scan-Request and Scan-Response)

FIGS. 25A to 25D are diagrams illustrating an example of a scan_request and a scan_response. When a Bluetooth® Low Energy advertiser device receives a scan_request from a Bluetooth® Low Energy scanner device, the Bluetooth® Low Energy advertiser device transmits a scan_response to the Bluetooth® Low Energy scanner device in response to the scan_request. FIGS. 25A to 25D illustrate an example of the scan_request and the scan_response.

FIGS. 25A and 25B each illustrate an example of a scan_request, and illustrate an example of an option that expands the Bluetooth® Low Energy standard of Bluetooth 5.1. SCAN_REQ in FIGS. 25A and 25B is a scan_request defined as the Bluetooth® Low Energy standard of Bluetooth 5.1. In the present exemplary embodiment, information in which a symbol "opt" indicating an option for requesting additional information is continuously set subsequent to the SCAN_REQ is transmitted. In FIG. 25A, an option indicating a request for the "position" and the "elevation" is set subsequent to the SCAN_REQ. A "place" is a symbol of an option requesting the "position" illustrated in FIG. 22, and an "elevation" is a symbol of an option requesting the "elevation" illustrated in FIG. 22. In FIG. 25B, an option indicating a request for the "position", the "elevation", the "moving speed", and the "true bearing" is set subsequent to the SCAN_REQ. A "speed" is a symbol of an option requesting the "moving speed" illustrated in FIG. 22, and a "direction" is a symbol of an option requesting the "true bearing" illustrated in FIG. 22. It is defined in such a manner that the symbol "opt" indicating an option and pieces of information are separated by a colon ":", and the "symbols" of pieces of information requested as an option are separated by a comma ",". In other words, an option set subsequent to the SCAN_REQ illustrated in FIG. 25A or 25B is request information for requesting position information and the like that are illustrated in FIG. 22, from a Bluetooth® Low Energy advertiser device.

FIGS. 25C and 25D each illustrate an example of a scan_response, and illustrate an example of an option that expands the Bluetooth® Low Energy standard of Bluetooth 5.1. FIG. 25C illustrates an example of a scan_response corresponding to the scan_request illustrated in FIG. 25A, and FIG. 25D illustrates an example of a scan_response corresponding to the scan_request illustrated in FIG. 25B. In FIG. 25C or 25D, SCAN_RSP is a scan_response defined as the Bluetooth® Low Energy standard of Bluetooth 5.1, and additional information is continuously set subsequent to the SCAN_RSP. It is defined in such a manner that pieces of information are separated by a comma ",", and the "symbol" and a value are separated by a colon ":".

(Communication Sequence Related to Transmission of Option Information)

Figure 17:
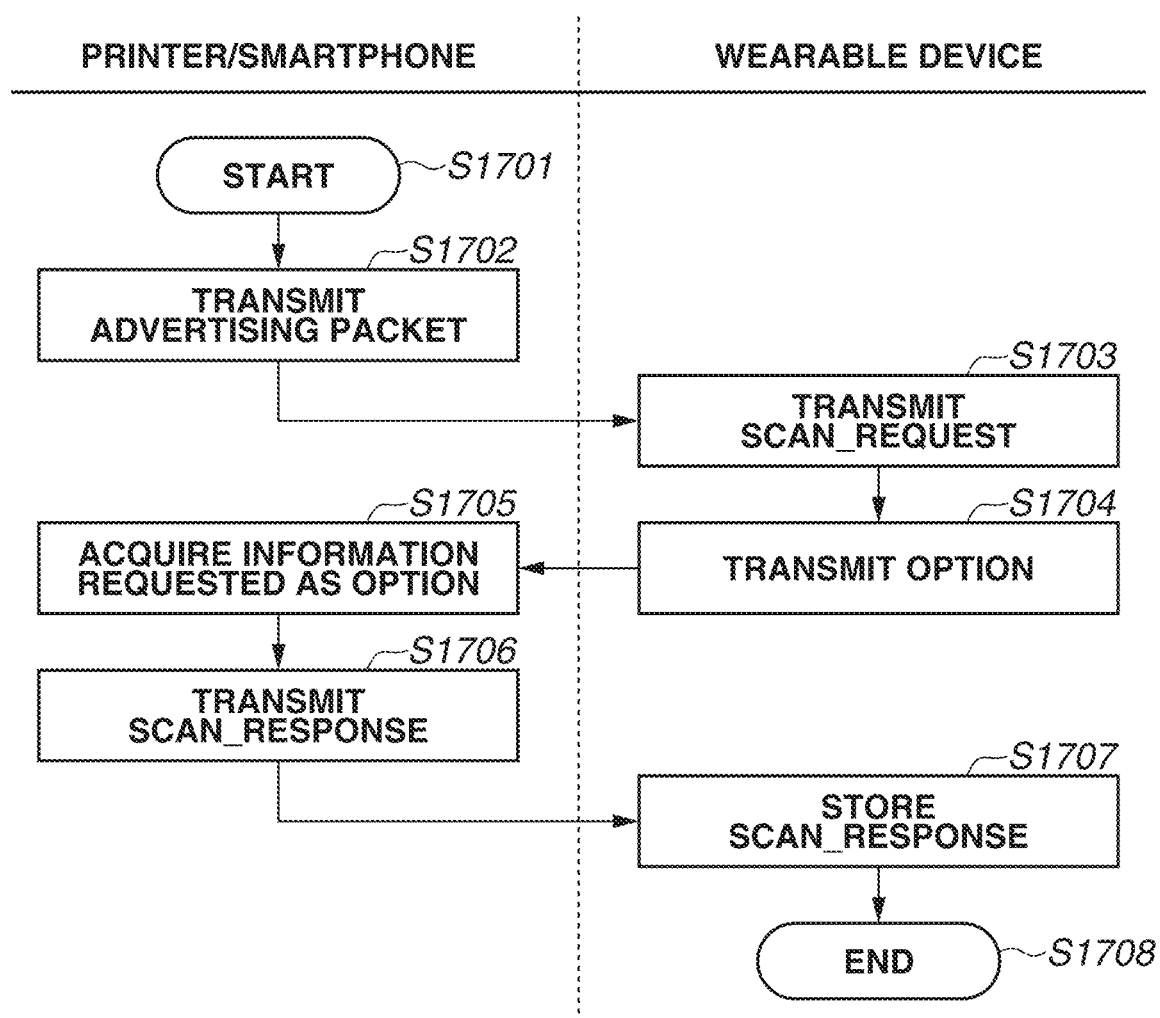
FIG. 17 is a flowchart illustrating an example of adding an option when a Bluetooth® Low Energy advertiser device transmits an advertising packet (scan_response).

FIG. 17 is a flowchart illustrating an example in which a Bluetooth® Low Energy advertiser device adds an option when transmitting an advertising packet (scan_response), and a Bluetooth® Low Energy scanner device receives the advertising packet (scan_response) and the option. A program related to the flowchart illustrated in FIG. 17 is stored in the ROM 104 or 152, for example, loaded onto the RAM 105 or 153, and executed by the CPU 103 or 154.

In step S1701, the printer 1402 or the smartphone 1403 serving as a Bluetooth® Low Energy advertiser device starts the transmission processing of an advertising packet.

In step S1702, the Bluetooth® Low Energy advertiser device transmits an advertising packet (e.g., ADV_IND) to a Bluetooth® Low Energy scanner device such as the wearable device 1404.

In step S1703, when the Bluetooth® Low Energy scanner device receives the advertising packet, the Bluetooth® Low Energy scanner device determines that information in the payload of the advertising packet is insufficient, and transmits the SCAN_REQ illustrated in FIG. 25A or 25B to the Bluetooth® Low Energy advertiser device.

In step S1704, the Bluetooth® Low Energy scanner device transmits an option (opt: xxx) requesting additional information (position information, etc.) illustrated in FIG. 25A or 25B, to the Bluetooth® Low Energy advertiser device.

In step S1705, the Bluetooth® Low Energy advertiser device receives the SCAN_REQ transmitted in step S1703 and the option transmitted in step S1704. Then, the Bluetooth® Low Energy advertiser device acquires information requested as the option illustrated in FIG. 25A or 25B, from the table illustrated in FIG. 22, and includes the information in the payload of the scan_response. In addition, in step S1705, after the SCAN_REQ transmitted in step S1703 is received, the option transmitted in step S1704 is received.

In step S1706, the Bluetooth® Low Energy advertiser device transmits the scan_response illustrated in FIG. 25C or 25D.

In step S1707, the Bluetooth® Low Energy scanner device receives the scan_response illustrated in FIG. 25C or 25D, and stores the scan_response into the RAM 104 or 153. Then, the processing proceeds to step S1708. In step S1708, the processing ends.

In the above-described example, the option (opt: xxx) is transmitted separately from the scan_request (SCAN_REQ), but the present exemplary embodiment is not limited to this. In a case where an option is included in a scan_request, the SCAN_REQ and the option (opt: xxx) may be transmitted together. In other words, a Bluetooth® Low Energy scanner device may transmit a scan_request including an option serving as request information.

(Processing Flow of Bluetooth® Low Energy Advertiser Device)

Figure 18A:
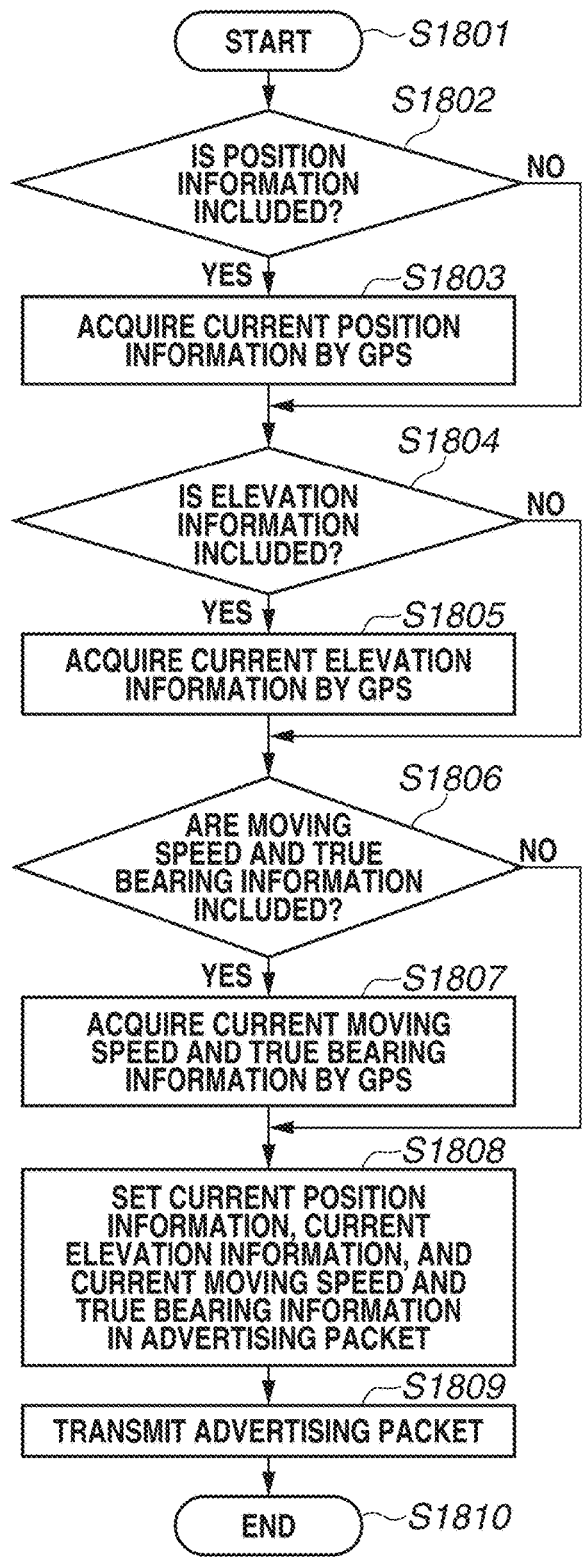
FIGS. 18A and 18B are flowcharts each illustrating an example of processing in which a Bluetooth® Low Energy advertiser device transmits an advertising packet (scan_response).
Figure 18B:
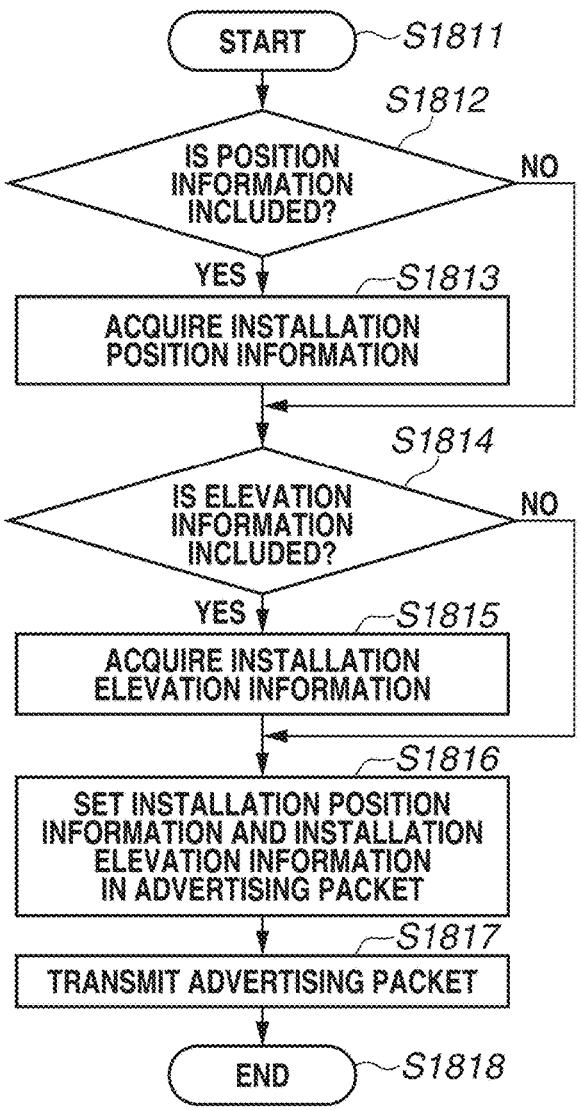

Next, the processing flow of the Bluetooth® Low Energy advertiser device in steps S1705 and S1706 of FIG. 17 will be described with reference to FIGS. 18A and 18B. FIGS. 18A and 18B are flowcharts each illustrating an example of processing in which a Bluetooth® Low Energy advertiser device transmits an advertising packet (scan_response). Programs related to the flowcharts illustrated in FIGS. 18A and 18B are stored in the ROM 104 or 152, for example, loaded onto the RAM 105 or 153, and executed by the CPU 103 or 154.

FIG. 18A is a flowchart illustrating an example of processing in which the smartphone 1403 serving as a Bluetooth® Low Energy advertiser device transmits an advertising packet (scan_response).

In step S1801, the smartphone 1403 starts the processing by receiving the scan_request illustrated in FIG. 25A or 25B that has been transmitted from the wearable device 1404.

In step S1802, the smartphone 1403 checks whether a received option includes the symbol "place" of the option requesting the "position". If the symbol is included (YES in step S1802), the processing proceeds to step S1803. If the symbol is not included (NO in step S1802), the processing proceeds to step S1804.

In step S1803, the smartphone 1403 acquires, from the memory, current position information indicated by the "position" illustrated in FIG. 22 that has been acquired by the GPS receiving unit 112.

In step S1804, the smartphone 1403 checks whether the received option includes the symbol "elevation" of the option requesting the "elevation". If the symbol is included (YES in step S1804), the processing proceeds to step S1805. If the symbol is not included (NO in step S1804), the processing proceeds to step S1806.

In step S1805, the smartphone 1403 acquires, from the memory, current elevation information indicated by the "elevation" illustrated in FIG. 22 that has been acquired by the GPS receiving unit 112.

In step S1806, the smartphone 1403 checks whether the received option includes the symbol "speed" of the option requesting the "moving speed" and the symbol "direction" of the option requesting the "true bearing". If these symbols are included (YES in step S1806), the processing proceeds to step S1807. If these symbols are not included (NO in step S1806), the processing proceeds to step S1808.

In step S1807, the smartphone 1403 acquires, from the memory, a current moving speed and true bearing information respectively indicated by the "moving speed" and "true bearing" illustrated in FIG. 22 that have been acquired by the GPS receiving unit 112.

In step S1808, the smartphone 1403 sets the acquired information into an advertising packet (scan_response) among the current position information, the current elevation information, and the current moving speed and the true bearing information.

In step S1809, the smartphone 1403 transmits the advertising packet (scan_response) to a Bluetooth® Low Energy scanner device such as a Bluetooth® Low Energy wearable device 1404.

In step S1810, the smartphone 1403 transmits all advertising packets (scan_responses), and then ends the transmission processing of an advertising packet (scan_response).

In the above-described flow, it is checked whether the symbols of the options requesting position information, elevation information, and a moving speed and true bearing information are included, but the present exemplary embodiment is not limited to this. It may be checked whether the symbol of the option requesting position information is included, or it may be checked whether the symbols of the options requesting position information and elevation information are included. Hereinafter, the description will be given of a flow of checking whether the symbols of the options requesting position information and elevation information are included.

FIG. 18B is a flowchart illustrating an example of processing in which the printer 1402 serving as a Bluetooth® Low Energy advertiser device transmits an advertising packet (scan_response).

In step S1811, the processing starts by the printer 1402 serving as a Bluetooth® Low Energy advertiser device receiving the scan_request illustrated in FIG. 25A or 25B that has been transmitted from the wearable device 1404.

In step S1812, the printer 1402 checks whether a received option includes the symbol "place" of the option requesting the "position". If the symbol is included (YES in step S1812), the processing proceeds to step S1813. If the symbol is not included (NO in step S1812), the processing proceeds to step S1814.

In step S1813, the printer 1402 acquires installation position information registered via the installation position registration portion 1902 and stored in the RAM 153.

In step S1814, the printer 1402 checks whether the received option includes the symbol "elevation" of the option requesting the "elevation". If the symbol is included (YES in step S1814), the processing proceeds to step S1815. If the symbol is not included (NO in step S1814), the processing proceeds to step S1816.

In step S1815, the printer 1402 acquires installation elevation information registered via the installation elevation registration portion 1903 and stored in the RAM 153.

In step S1816, the printer 1402 sets acquired information into an advertising packet (scan_response) among the installation position information and the installation elevation information.

In step S1517, the printer 1402 transmits the advertising packet (scan_response) to a Bluetooth® Low Energy scanner device such as the wearable device 1404.

In step S1518, the printer 1402 transmits all advertising packets (scan_responses), and then ends the transmission processing of an advertising packet (scan_response).

Through the flows described above with reference to FIGS. 18A and 18B, a Bluetooth® Low Energy advertiser device can transmit requested information such as position information only when requested. This can reduce the power consumption of a Bluetooth® Low Energy device because required information is transmitted only when necessary.

(Setting Information for Designating Option)

In the present exemplary embodiment, a Bluetooth® Low Energy scanner device designates information regarding an option in advance. Specifically, a Bluetooth® Low Energy scanner device transmits setting information in advance for a Bluetooth® Low Energy advertiser device to store the position information illustrated in FIG. 25C or 25D in a scan_response.

FIGS. 27A to 27C are diagrams each illustrating an example of setting information for designating an option. The setting information is transmitted by a Bluetooth® Low Energy scanner device. FIG. 27A illustrates an example of setting an option of the "position" and an "effective time" of the option. FIG. 27B illustrates an example of setting an option of the "elevation" and an "effective time" of the option. FIG. 27C illustrates an example of setting options of the "moving speed" and the "true bearing" and an "effective time" of these options. A symbol of the option of the "position" is "place", a symbol of the option of the "elevation" is "elevation", a symbol of the option of the "moving speed" is "speed", and a symbol of the option of the "true bearing" is "direction". A symbol of the effective time is "time", and a value of the effective time is set after a colon ":". A unit of the value of the effective time is "second". When the effective time is "0", the effective time indicates that a corresponding option is deactivated. In a case where the effective time is "9999", the effective time indicates that a corresponding option is activated indefinitely.

(Sequence Related to Transmission of Setting Information)

Figure 24:
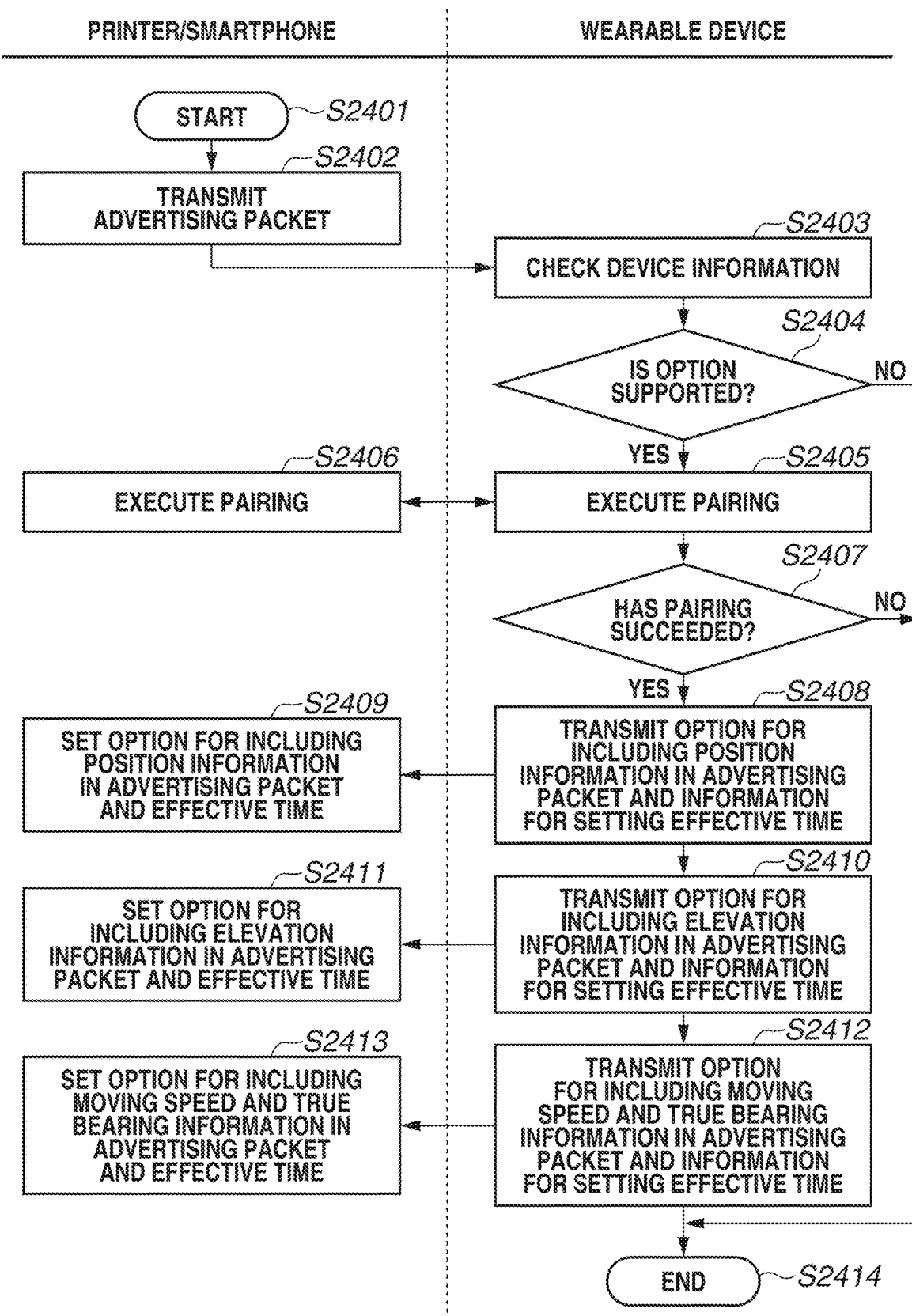
FIG. 24 is a flowchart illustrating an example of setting an option to be used when a Bluetooth® Low Energy advertiser device transmits an advertising packet (scan_response).

Next, a sequence related to the transmission of setting information will be described. FIG. 24 is a flowchart illustrating an example in which a Bluetooth® Low Energy advertiser device designates an option by transmitting setting information via GATT communication, and sets the option in the Bluetooth® Low Energy advertiser device. A program related to the flowchart illustrated in FIG. 24 is stored in the ROM 104 or 152, for example, loaded onto the RAM 105 or 153, and executed by the CPU 103 or 154.

In step S2401, the printer 1402 or the smartphone 1403 serving as a Bluetooth® Low Energy advertiser device starts the transmission processing of an advertising packet.

In step S2402, the Bluetooth® Low Energy advertiser device transmits an advertising packet (e.g., ADV_IND) to a Bluetooth® Low Energy scanner device such as the wearable device 1404.

In step S2403, the Bluetooth® Low Energy scanner device acquires device information (e.g., the device name 903 illustrated in FIG. 5) from information included in the advertising packet, and checks the acquired device information.

In step S2404, the Bluetooth® Low Energy scanner device checks whether the Bluetooth® Low Energy scanner device is a device supporting a function of an option for including additional information in an advertising packet (scan_response). If the Bluetooth® Low Energy scanner device supports the function (YES in step S2404), the processing proceeds to step S2405. If the Bluetooth® Low Energy scanner device does not support the function (NO in step S2404), the processing proceeds to step S2414.

In steps S2405 and S2406, the Bluetooth® Low Energy scanner device and the Bluetooth® Low Energy advertiser device execute pairing. If the pairing has already been executed, steps S2405 and S2406 may be skipped.

In step S2407, the Bluetooth® Low Energy scanner device checks whether the pairing has succeeded. If the pairing has succeeded (YES in step S2407), the processing proceeds to step S2408. If the pairing has failed (NO in step S2407), the processing proceeds to step S2414.

In step S2408, the Bluetooth® Low Energy scanner device transmits the setting information illustrated in FIG. 27A to the Bluetooth® Low Energy advertiser device via GATT communication. As described above, the setting information is information for designating additional information to be included in a scan_response to be transmitted by the Bluetooth® Low Energy advertiser device. In this example, the Bluetooth® Low Energy scanner device transmits the setting information illustrated in FIG. 27A that designates position information as an option and designates that the option is effective for 600 seconds as an effective time.

In step S2409, if the Bluetooth® Low Energy advertiser device receives the setting information, the Bluetooth® Low Energy advertiser device sets an option for including position information in an advertising packet (scan_response), and an effective time of the option.

In step S2410, the Bluetooth® Low Energy scanner device transmits the setting information illustrated in FIG. 27B to the Bluetooth® Low Energy advertiser device via GATT communication. In this example, the Bluetooth® Low Energy scanner device transmits, via GATT communication, the setting information illustrated in FIG. 27B that designates elevation information as an option and designates 360 seconds as an effective time of the option.

In step S2411, if the Bluetooth® Low Energy advertiser device receives the setting information, the Bluetooth® Low Energy advertiser device sets an option for including elevation information in an advertising packet (scan_response), and an effective time of the option.

In step S2412, the Bluetooth® Low Energy scanner device transmits the setting information illustrated in FIG. 27C to the Bluetooth® Low Energy advertiser device via GATT communication. In this example, the Bluetooth® Low Energy scanner device transmits, via GATT communication, the setting information illustrated in FIG. 27C that designates a moving speed and true bearing information as an option and designates 300 seconds as an effective time of the option.

In step S2413, if the Bluetooth® Low Energy advertiser device receives the setting information, the Bluetooth® Low Energy advertiser device sets an option for including the moving speed and true bearing information in an advertising packet (scan_response), and an effective time of the option.

In step S2414, the Bluetooth® Low Energy scanner device ends the transmission processing of setting information designating an option.

Through the flow described above with reference to FIG. 24, a Bluetooth® Low Energy scanner device can designate in advance information (position information, etc.) desired to be acquired from a Bluetooth® Low Energy advertiser device.

As a third exemplary embodiment, there is an example of skipping the inclusion of information such as position information in an advertising packet (scan_response). For example, position information may be transmitted once every two times. As another example, a speed sensor can be used in combination, and position information may be transmitted when a large movement is observed, in consideration of a moving speed. This can reduce the power consumption of a Bluetooth® Low Energy device such as the printer 1402, the smartphone 1403, and the wearable device 1404.

Other Exemplary Embodiment

Heretofore, the exemplary embodiments have been described in detail, but the present invention is not limited to a specific exemplary embodiment. Various changes and modifications can be made without departing from the spirit of the present invention.

In the above-described first and second exemplary embodiments, the route guidance applications 2001 and 2004 are used as an example of an application, but an application is not limited to these examples. An arbitrary application having a similar function can be applied and effective.

In the above-described first and second exemplary embodiments, Bluetooth 5.1 is used as a communication method, but a communication method is not limited to this communication method. An arbitrary communication method having a similar function can be applied and effective.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an exemplary embodiment of the present disclosure, it becomes possible to identify an absolute position.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-102865, filed May 31, 2019, which is hereby incorporated by reference herein in its entirety.

What is claimed is:

1. A system including (i) a Bluetooth advertiser device that executes communication with a Bluetooth scanner device and (ii) the Bluetooth scanner device, the system comprising:
at least one processor causing the Bluetooth advertiser device to act as:
a first communication unit configured to transmit advertising information based on a Bluetooth standard;
a first acquisition unit configured to acquire position information of the Bluetooth advertiser device; and
a setting unit configured to set the Bluetooth advertiser device to include, in the advertising information, the acquired position information of the Bluetooth advertiser device, and
at least one processor causing the Bluetooth scanner device to act as:
a second communication unit configured to receive the advertising information based on the Bluetooth standard transmitted from the Bluetooth advertiser device;
an obtaining unit configured to obtain the position information of the Bluetooth advertiser device included in the received advertising information;
a second obtaining unit configured to obtain a distance between a first antenna and a second antenna of a plurality of antennas configured to receive the advertising information and included in the Bluetooth scanner device and information regarding an angle identified based on the received advertising information between the Bluetooth advertiser device and the Bluetooth scanner device; and
a third obtaining unit configured to obtain position information of the Bluetooth scanner device,
wherein the first communication unit transmits the advertising information including the acquired position information of the Bluetooth advertiser device, and
wherein the transmitted advertising information including the acquired position information of the Bluetooth advertiser device is received by the Bluetooth scanner device and used for acquiring the position information of the Bluetooth scanner device, and
wherein the third obtaining unit obtains the position information of the Bluetooth scanner device based on the obtained position information of the Bluetooth advertiser device and the obtained information regarding the angle between the Bluetooth advertiser device and the Bluetooth scanner device.

2. The Bluetooth advertiser device according to claim 1, wherein the acquisition unit acquires the position information by a global positioning system (GPS).

3. The Bluetooth advertiser device according to claim 1, wherein the first acquisition unit acquires the position information based on information regarding an installation position of the apparatus that is registered in the apparatus.

4. The Bluetooth advertiser device according to claim 1, wherein, in a case where the first communication unit receives request information requesting the position information, the first communication unit transmits advertising information including the position information, and in a case where the first communication unit does not receive the request information, the first communication unit transmits advertising information not including the position information.

5. The Bluetooth advertiser device according to claim 1, wherein the first acquisition unit further acquires elevation information of the apparatus, and wherein the first communication unit transmits advertising information including the acquired position information and elevation information.

6. The Bluetooth advertiser device according to claim 1, wherein the first communication unit includes a plurality of antennas that transmits advertising information.

7. The Bluetooth advertiser device according to claim 1, wherein the first communication unit executes communication that is based on the Bluetooth standard, and
the setting unit includes the acquired position information of the Bluetooth advertiser device in a payload of the advertising information.

8. A Bluetooth scanner device that executes communication with a Bluetooth advertiser device, the Bluetooth scanner device comprising:
at least one processor causing the Bluetooth scanner device to act as:
a communication unit configured to receive advertising information based on a Bluetooth standard transmitted from the Bluetooth advertiser device;
an obtaining unit configured to obtain position information of the Bluetooth advertiser device included in the received advertising information;
a first acquisition unit configured to acquire a distance between a first antenna and a second antenna of a plurality of antennas configured to receive the advertising information and included in the Bluetooth scanner device and information regarding an angle identified based on the received advertising information between the Bluetooth advertiser device and the Bluetooth scanner device; and
a second acquisition unit configured to acquire position information of the Bluetooth scanner device,
wherein the second acquisition unit acquires the position information of the Bluetooth scanner device based on the obtained position information of the Bluetooth advertiser device and the acquired information regarding the angle between the Bluetooth advertiser device and the Bluetooth scanner device.

9. The Bluetooth scanner device according to claim 8, wherein the second acquisition unit acquires the position information of the Bluetooth scanner device further using information regarding radio field intensity of the received advertising information.

10. The Bluetooth scanner device according to claim 8, wherein the communication unit transmits request information requesting position information of the Bluetooth advertiser device.

11. The Bluetooth scanner device according to claim 8, the at least one processor, further causing the Bluetooth scanner device to act as a display control unit configured to display, on a display unit, a guidance screen indicating a position of the Bluetooth scanner device, using the position information of the Bluetooth scanner device that has been acquired by the second acquisition unit.

12. The Bluetooth scanner device according to claim 8, wherein the communication unit executes communication that is based on a Bluetooth standard, and the position information of the Bluetooth advertiser device is obtained from a payload of the advertising information.

13. A control method for a Bluetooth scanner device that executes communication, the control method comprising:
receiving advertising information based on a Bluetooth standard transmitted from the Bluetooth advertiser device;
obtaining position information of the Bluetooth advertiser device included in the received advertising information,
obtaining a distance between a first antenna and a second antenna of a plurality of antennas configured to receive the advertising information and included in the Bluetooth scanner device and information regarding an angle identified based on the received advertising information between the Bluetooth advertiser device and the Bluetooth scanner device;
and
obtaining position information of the Bluetooth scanner device,
wherein the position information of the Bluetooth scanner device is obtained based on the obtained position information of the Bluetooth advertiser device and the obtained information regarding the angle between the Bluetooth advertiser device and the Bluetooth scanner device.

14. The control method according to claim 13, wherein the position information of the Bluetooth scanner device is acquired further using information regarding radio field intensity of the received advertising information.

15. The control method according to claim 13, wherein request information requesting the position information of the Bluetooth advertiser device is transmitted.

16. The control method according to claim 13, the control method further comprising:
displaying, on a display unit, a guidance screen indicating a position of the Bluetooth scanner device, using the position information of the Bluetooth scanner device that has been acquired.

17. The control method according to claim 13, wherein communication that is based on a Bluetooth standard is executed, and the position information of the Bluetooth advertiser device is obtained from a payload of the advertising information.

18. The control method according to claim 13, further comprising:
obtaining information regarding a distance identified based on radio field intensity of the received advertising information between the Bluetooth advertiser device and the Bluetooth scanner device,
wherein, in the acquiring, the position information of the Bluetooth scanner device is acquired based on the obtained position information of the Bluetooth advertiser device, the acquired information regarding the angle between the Bluetooth advertiser device and the Bluetooth scanner device, and information regarding a distance between the Bluetooth advertiser device and the Bluetooth scanner device.

19. The control method according to claim 13, wherein the position information of the Bluetooth advertiser device included in the received advertising information is information acquired by the Bluetooth advertiser device using a Global Positioning System (GPS).

20. The control method according to claim 13, wherein the information regarding the angle between the Bluetooth advertiser device and the Bluetooth scanner device is obtained based on a distance of Bluetooth 5.1.

21. The control method according to claim 13, wherein the Bluetooth scanner device is a device not including a Global Positioning System (GPS), and in the acquiring, the position information of the Bluetooth scanner device is acquired without using the GPS by the Bluetooth scanner device.

22. The control method according to claim 13, wherein the Bluetooth advertiser device is a printer.

\* \* \* \* \*